(12) United States Patent
Yasumoto et al.

(10) Patent No.: US 6,829,455 B2
(45) Date of Patent: Dec. 7, 2004

(54) DRIVING FORCE TRANSMISSION MECHANISM, IMAGE FORMING APPARATUS EQUIPPED WITH SUCH A MECHANISM, AND PROCESS UNIT OF SUCH AN APPARATUS

(75) Inventors: Takeshi Yasumoto, Abiko (JP); Akio Ono, Toride (JP); Atsushi Numagami, Hadano (JP); Yukihiro Fujiwara, Toride (JP); Kazunari Murayama, Shizuoka-ken (JP); Shigeru Hoashi, Numazu (JP); Takahito Ueno, Shizuoka-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/978,213

(22) Filed: Oct. 17, 2001

(65) Prior Publication Data

US 2002/0057928 A1 May 16, 2002

(30) Foreign Application Priority Data

| Oct. 20, 2000 | (JP) | .................................. 2000-320945 |
| Oct. 31, 2000 | (JP) | .................................. 2000-333198 |
| Nov. 9, 2000 | (JP) | .................................. 2000-342354 |

(51) Int. Cl.⁷ ............................................. G03G 15/00
(52) U.S. Cl. ..................................................... 399/167
(58) Field of Search ............................... 399/111, 116, 399/117, 167

(56) References Cited

U.S. PATENT DOCUMENTS

| 5,371,576 A | * | 12/1994 | Gonda ........................... 399/167 |
| 5,768,656 A | * | 6/1998 | Nagasue et al. ............. 399/167 X |
| 5,768,658 A | | 6/1998 | Watanabe et al. ............. 399/111 |
| 5,903,803 A | | 5/1999 | Kawai et al. .................. 399/116 |
| 5,920,753 A | | 7/1999 | Sasaki et al. .................. 399/111 |
| 5,937,242 A | | 8/1999 | Yokoyama et al. ............ 399/114 |
| 5,966,568 A | | 10/1999 | Numagami et al. ........... 399/111 |
| 6,006,058 A | | 12/1999 | Watanabe et al. ............. 399/167 |
| 6,011,942 A | * | 1/2000 | Taniguchi et al. ............. 399/167 |
| 6,016,413 A | | 1/2000 | Yokoyama et al. ............ 399/113 |
| 6,029,032 A | | 2/2000 | Watanabe et al. ............. 399/111 |
| 6,035,159 A | * | 3/2000 | Azuma et al. ................. 399/111 |
| 6,097,909 A | | 8/2000 | Watanabe et al. ............. 399/111 |
| 6,101,354 A | | 8/2000 | Nakagawa et al. ............ 399/225 |
| 6,118,960 A | | 9/2000 | Nakagawa et al. ............ 399/111 |
| 6,128,454 A | | 10/2000 | Kawai et al. .................. 399/116 |
| 6,131,007 A | | 10/2000 | Yamaguchi et al. ........... 399/256 |
| 6,169,866 B1 | | 1/2001 | Watanabe et al. ............. 399/111 |
| 6,226,478 B1 | | 5/2001 | Watanabe et al. ............. 399/117 |
| 6,236,821 B1 | | 5/2001 | Yokoyama et al. ............ 399/113 |
| 6,246,849 B1 | | 6/2001 | Yokoyama et al. ............ 399/117 |
| 6,266,503 B1 | | 7/2001 | Murayama et al. ............ 399/117 |
| 6,272,299 B1 | | 8/2001 | Numagami et al. ........... 399/111 |
| 6,289,189 B1 | | 9/2001 | Numagami et al. ........... 399/111 |
| 6,349,188 B1 | | 2/2002 | Kawai et al. .................. 399/116 |
| 6,501,926 B1 | | 12/2002 | Watanabe et al. ............. 399/117 |
| 6,501,927 B1 | | 12/2002 | Watanabe et al. ............. 399/117 |

FOREIGN PATENT DOCUMENTS

CN  1164052 A  11/1997

* cited by examiner

*Primary Examiner*—Sandra Brase
(74) *Attorney, Agent, or Firm*—Fitzpatrick, Cella, Harper & Scinto

(57) ABSTRACT

A drive transmission apparatus includes a first coupling portion having a polygonal shape; a second coupling portion having a hole portion which has a cross-sectional configuration larger than the first coupling portion, the hole portion being engageable with the first coupling portion; and a center shaft provided on the first coupling or the second coupling, the center shaft penetrating the other one of the first and second coupling.

39 Claims, 16 Drawing Sheets

DRIVING FORCE TRANSMISSION MECHANISM, IMAGE FORMING APPARATUS EQUIPPED WITH SUCH A MECHANISM, AND PROCESS UNIT OF SUCH AN APPARATUS

FIELD OF THE INVENTION AND RELATED ART

The present invention relates to an image forming apparatus equipped with a driving force transmission mechanism, and a process unit used by such an image forming apparatus.

Conventionally, a driving system for driving a photoconductive drum, as an image bearing member, of an image forming apparatus such as a copying machine, a printer, or the like comprises: a driving gear, which receives the driving force from the motor of the main assembly of the image forming apparatus, and transmits the driving force; and a gear shaft, which is coaxial with the driving gear, and rotates with the driving gear. There are two methods for driving a photoconductive drum with the use of such a driving system: a driving method which employs a driving shaft with a coupling, and a driving method which employs a driving shaft without a coupling. FIG. 12 shows the rough concept of a driving method which employs a driving shaft without a coupling.

Referring to FIG. 12, a gear shaft 13 directly connected to a drive gear 12 is put through a photoconductive drum 80, and is used as the drum shaft for the photoconductive drum 80. In this case, the photoconductive drum 80 is supported so that it rotates with the gear shaft 13. With this driving method, the rotation of the driving gear 12 for transmitting the driving force of a motor 11 is directly transmitted to the photoconductive drum 80.

FIG. 13 shows the rough concept of the driving method which employs a driving shaft with a coupling. In this case, the gear shaft 13 is indirectly connected to the photoconductive drum 80, with the interposition of a coupling 23, and the driving force from the motor 11 is transmitted to the photoconductive drum 80 through the gear shaft 13 and coupling 23.

Comparing the two driving methods, the method which employs a coupling is superior in terms of cost. Further, in the case of an image formation system constructed around a photoconductive drum, a photoconductive drum has come to be integrally disposed, along with a single or a plurality of processing apparatuses, such as a developing apparatus, in a cartridge (process cartridge). Consequently, it has become considered important how easy a process cartridge is to mount into, or dismount from, the image forming apparatus main assembly. This has called attention to various couplings, that is, devices for connecting two shafts to transmit a driving force from one shaft to the other. Among various couplings, couplings such as the one shown in FIG. 14 which comprise a combination of a female type coupler and a male type coupler, and in which driving force is transmitted through the engagement between the two couplers, have begun to attract special attention because of their superiority in terms of driving force transmission performance. The couplings such as the one shown in FIG. 14 have come to be widely used, because of their advantage in driving force transmission performance.

However, a coupling based driving method is inferior to a direct driving method in terms of driving force transmission accuracy; in other words, there is a concern that a coupling based driving method suffers from the problem regarding the angle at which two shafts are connected to each other by a coupling, the problem regarding how two shafts are aligned with each other by a coupling, or the like problems. When an image forming apparatus suffers from the problems described above, an image becomes misaligned relative to a recording medium, degrading image quality. This problem is particularly conspicuous in an image forming apparatus which forms a color image on recording medium by placing a plurality of images different in color, in layers.

As a coupling for solving the above described problems, there is a coupling comprising a combination of a female type coupler and a male type coupler, at least one of which is in the form of a polygonal piller. FIG. 15 shows an example of such a coupling comprising a female type coupler with a hole in the form of a polygonal pillar, and a male type coupler with a projection in the form of a polygonal pillar.

Referring to FIG. 15, a gear shaft 13, that is, one of the components of the driving system I of the apparatus main assembly, is provided with a female type coupler 14, which is attached to one end of the gear shaft 13, and is provided with a twisted hole 50, the cross section of which is in the form of an equilateral triangle.

On the other hand, the photoconductive drum 80, or a cylindrical member which constitutes one of the components of the system to be driven by the driving system I, is provided with a twisted projection 10, which is the same in twist angle as the twisted hole of the female type coupler 50, and the cross section of which is in the form of an equilateral triangle. A male type portion 53 with the projection 10 in the form of a twisted pillar with a cross section in the form of an equilateral triangle doubles as a drum flange 80. Although the projection 10 is in the form of an equilateral triangular pillar, here, it may be in the form of a polygonal pillar, the cross section of which is not in the form of an equilateral triangle. When one of the lateral walls of the hole of the female type portion is in contact with one of the lateral walls of the male type portion, the interface between the two members forms a twisted line 60. Therefore, as a rotational force is applied to the female type portion while the two members are in engagement with each other, the male type portion, that is, the member on the photoconductive drum 80 side is pulled into the female type portion, or the member on the apparatus main assembly side, being accurately positioned relative to the apparatus main assembly. As a result, the two shafts are precisely connected by this effect, that the male type portion is pulled into the female type portion, and the play between the photoconductive drum 80 and apparatus main assembly in terms of the thrust and radial directions of the photoconductive drum 80 is eliminated.

FIG. 16 shows the cross sections of the female and male type portions 14 and 53 in engagement with each other, at a plane perpendicular to the axial lines of the two members. In FIG. 16(a), the solid line represents the cross section of the female type portion 71, or the driving side, with the hole 50, the cross section of which is in the form of an equilateral triangle, and the broken line represents the projection 10, or the driven side, the cross section of which is in the form of an equilateral triangle. Under the condition depicted by FIG. 16(a), although the projection 10 is in the hole 50, the edges of the projection 10 are not in contact with the corresponding lateral walls of the hole 50, and therefore, there is play between the two members, and the axial line C1 of the female type portion does not coincide with the axial line C2 of the male type portion. However, as rotational force is applied to the female type portion 71, the three lateral walls of the hole 50 contact the three edges of the projection 10, one for one, automatically causing the axial lines C1 and C2 to coincide with each other, as shown in FIG. 16(b). Under the condition depicted by FIG. 16(b), the driving force applied to the female type portion 71 is transmitted as forces F by the interfaces (contact points) between the female and male type portions.

As described above, a coupling which comprises a combination of a female type portion and a male type portion, and in which the male type portion is engaged into, and then is placed in contact with, the female type portion, makes it possible to connect two shafts while automatically aligning the two shafts, accurately positioning them, and eliminating the play. Therefore, such a coupling is considered effective as a member for the connection between the photoconductive drum of an image formation unit in the form of a cartridge, and the image forming apparatus main assembly. Further, a coupling, in which the hole of the female type portion and the projection of the male type portion are in the form of a twisted polygonal pillar, provides the effect that a photoconductive drum is pulled toward the image forming apparatus main assembly in terms of their axial directions, in addition to the above described effects.

The above described coupling, however, suffers from the problem that as the driven system is subjected to a force other than the force transmitted from the driving system, the contact between the two systems is disturbed. For example, as a photoconductive drum comes into contact with an intermediary transfer member, the photoconductive member is subjected to such force that is applied to the photoconductive member in the circumferential direction of the photoconductive member, and this force disturbs the contact between the two members of the above described coupling. More specifically, two shafts to which the female and male type portions of the aforementioned coupling are attached one for one are kept aligned with each other by the contact between the two members of the coupling, and therefore, as the contact between the two members is disturbed, the two shafts become misaligned with each other, causing an image to be misaligned with the recording medium, as the image is formed. This has been a significant problem.

SUMMARY OF THE INVENTION

Thus, the primary object of the present invention is to provide a driving force transmission mechanism, which assures that even when the contact between the female and male type portions of a coupling is disturbed by a force other than the force transmitted to the driven system from a driving system, the normal contact is maintained between the female and male type portions of the coupling, so that the cylindrical member of a driven system remains properly supported, and the accuracy of the alignment between the driven and driving systems is maintained regardless of the size of the play between the female and male type portions when they are in engagement with each other.

According to an aspect of the present invention, there is provided a drive transmission apparatus comprising a first coupling portion having a polygonal shape; a second coupling portion having a hole portion which has a cross-sectional configuration larger than the first coupling portion, the hole portion being engageable with the first coupling portion; and a center shaft provided on the first coupling or the second coupling, the center shaft penetrating the other one of the first and second coupling.

According to another aspect of the present invention, there is provided an image forming apparatus comprising a photosensitive member; charging means for charging the photosensitive member; image forming means for forming an electrostatic image on the photosensitive and charged by the charging means; developing means for developing the electrostatic image; transferring means for transferring the image developed by the developing means onto a recording material; a driving source; a driver for transmitting a driving force from the driving source to the photosensitive member; a first coupling portion having a polygonal shape; a second coupling portion having a hole portion which has a cross-sectional configuration larger than the first coupling portion, the hole portion being engageable with the first coupling portion; and a center shaft provided on the first coupling or the second coupling, the center shaft penetrating the other one of the first and second coupling; wherein the photosensitive member has one of the first coupling portion and the second coupling portion, and the driver as the other coupling portion.

According to a further aspect of the present invention, there is provided a process unit which is detachably mountable to an image forming apparatus having a driving portion, the process unit including process means actable on the photosensitive member, the process unit comprising a first coupling portion having a polygonal shape and engageable with the driving portion of the main assembly of the apparatus; a hole portion engaged with a center shaft penetrating an engaging portion between the first coupling portion and the driver.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Hereinafter, a driving force transmission mechanism, an image forming apparatus, and a process unit, which are in accordance with the present invention, will be described with reference to the appended drawings. In the following descriptions, the members which are similar to those described above will be given the same referential codes as the referential codes given to those described above.
Embodiment 1

Figure 1:
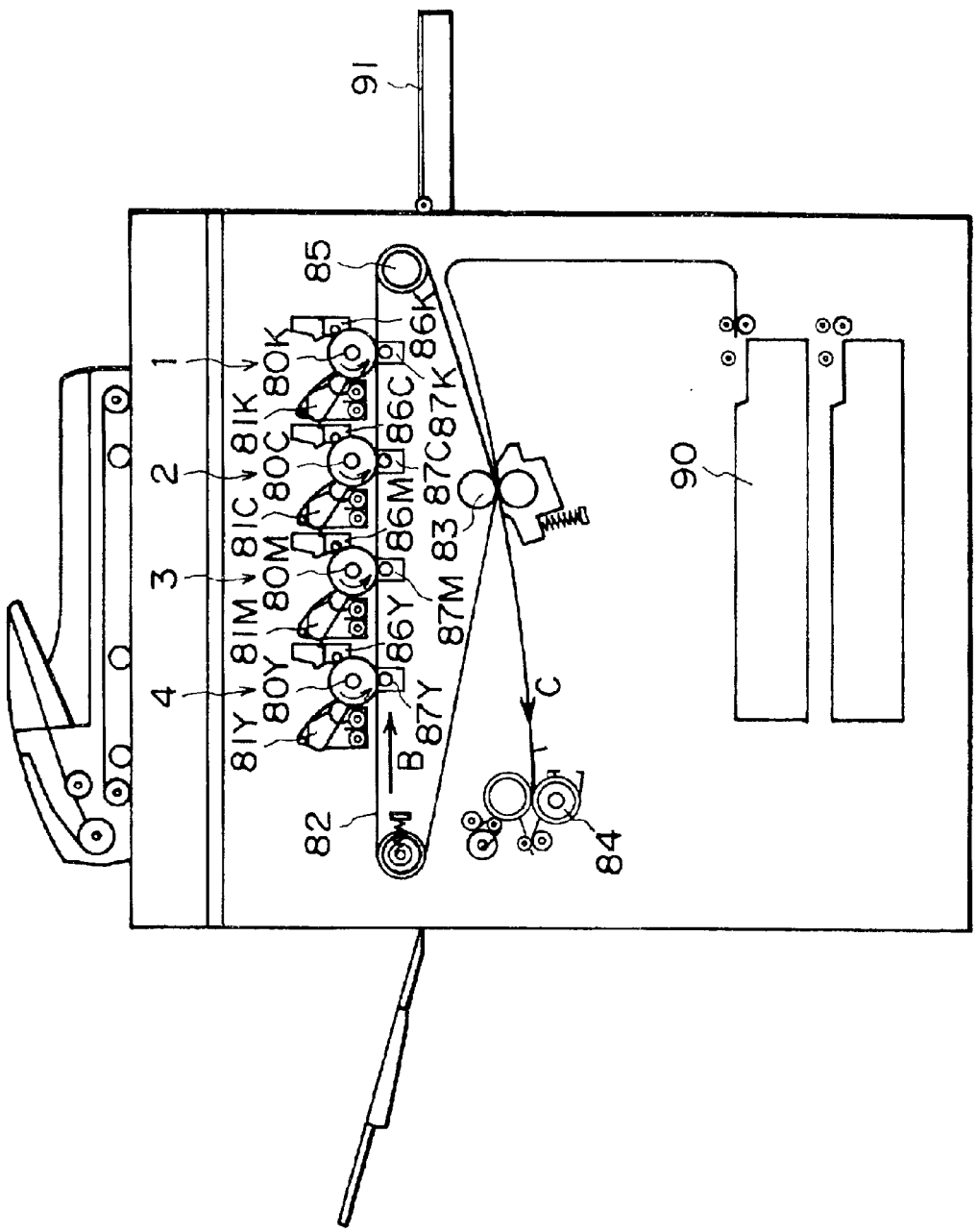
FIG. 1 is a schematic sectional view of an example of an image forming apparatus in accordance with the present invention.
Figure 2:
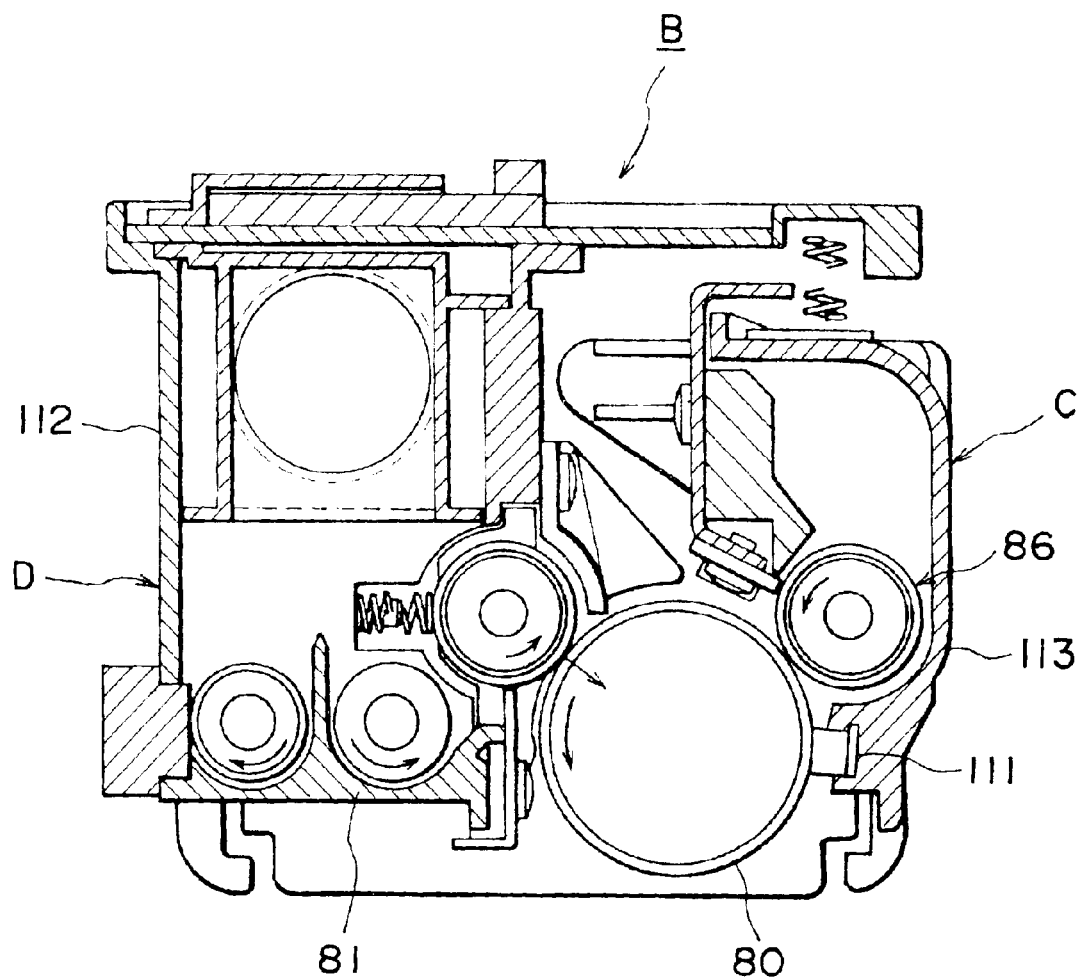
FIG. 2 is a sectional view of an example of a process unit in accordance with the present invention.

Referring to FIGS. 1 and 2, the first embodiment of the present invention will be described.

First, the image forming apparatus in this embodiment will be described with reference to FIG. 1. The image forming apparatus in this embodiment is an electrophotographic color image forming apparatus, which employs an intermediary transfer belt 82. It also has yellow, magenta, cyan, and black image forming stations 1, 2, 3 and 4, which are disposed in parallel along the horizontal portion of the intermediary transfer belt 82. In the drawing, referential codes Y, M, C and K mean yellow, magenta, cyan, and black colors, correspondingly. Although the image forming station arrangement order is Y, M, C and K from the left in this embodiment, it may be different from the order in this embodiment.

The image forming stations 1–4 comprises: photoconductive drums 80Y, 80M, 80C and 80K, as image bearing members; charging apparatuses 86Y, 86M, 86C and 86K; an unshown exposing apparatus; and developing means 81Y, 81M, 81C and 81K, correspondingly.

Referring to FIG. 2, the photoconductive drums 80Y, 80M, 80C and 80K, charging apparatuses 86Y, 86M, 86C and 86K, and developing means 81Y, 81M, 81C and 81K, are integrally disposed in four process cartridges, one for one, being unitized, which are removably mountable in the main assembly of an image forming apparatus by being assisted by an unshown mounting means.

The photosensitive drums 80Y, 80M, 80C and 80K, are uniformly charged by the charging apparatuses 86Y, 86M, 86C and 86K, correspondingly, and then, four latent images in accordance with image formation data are formed on the photoconductive drums 80Y, 80M, 80C and 80K, one for one, by the unshown exposing apparatus. The four latent images are visualized as four toner images by the developing means 81Y, 81M, 81C and 81K, correspondingly, and are transferred (primary transfer) in layers onto the intermediary transfer belt 82, which is being rotated in the direction of an arrow mark B by a driving roller 85, by the functions of transferring apparatuses 87Y, 87M, 87C and 87K, correspondingly. Then, the four toner images on the intermediary transfer belt 82 are transferred all at once onto a transfer medium as a recording medium, which is being conveyed in the direction of an arrow mark C from sheet feeding stations 90 or 91, in the secondary transfer station 83. Thereafter, the transfer medium onto which the four toner images have been transferred all at once is conveyed to a fixing apparatus, in which the four toner images are permanently fixed to the transfer medium, becoming a permanently fixed full-color image.

Also referring to FIG. 2, each process unit B in this embodiment comprises a development unit D and charging unit C, which are integrally joined with each other. The development unit D comprises a photoconductive drum 80, a developing means, and a developing means frame 112, and the photoconductive drum 80 and developing means are integrally disposed in the developing means frame 112. The charging unit C comprises a charging means 86, a charging brush 111, a charging means frame 113, and the like, and the charging means 86, charging brush 111, and the like, are integrally disposed in the charging means frame 113.

Figure 3:
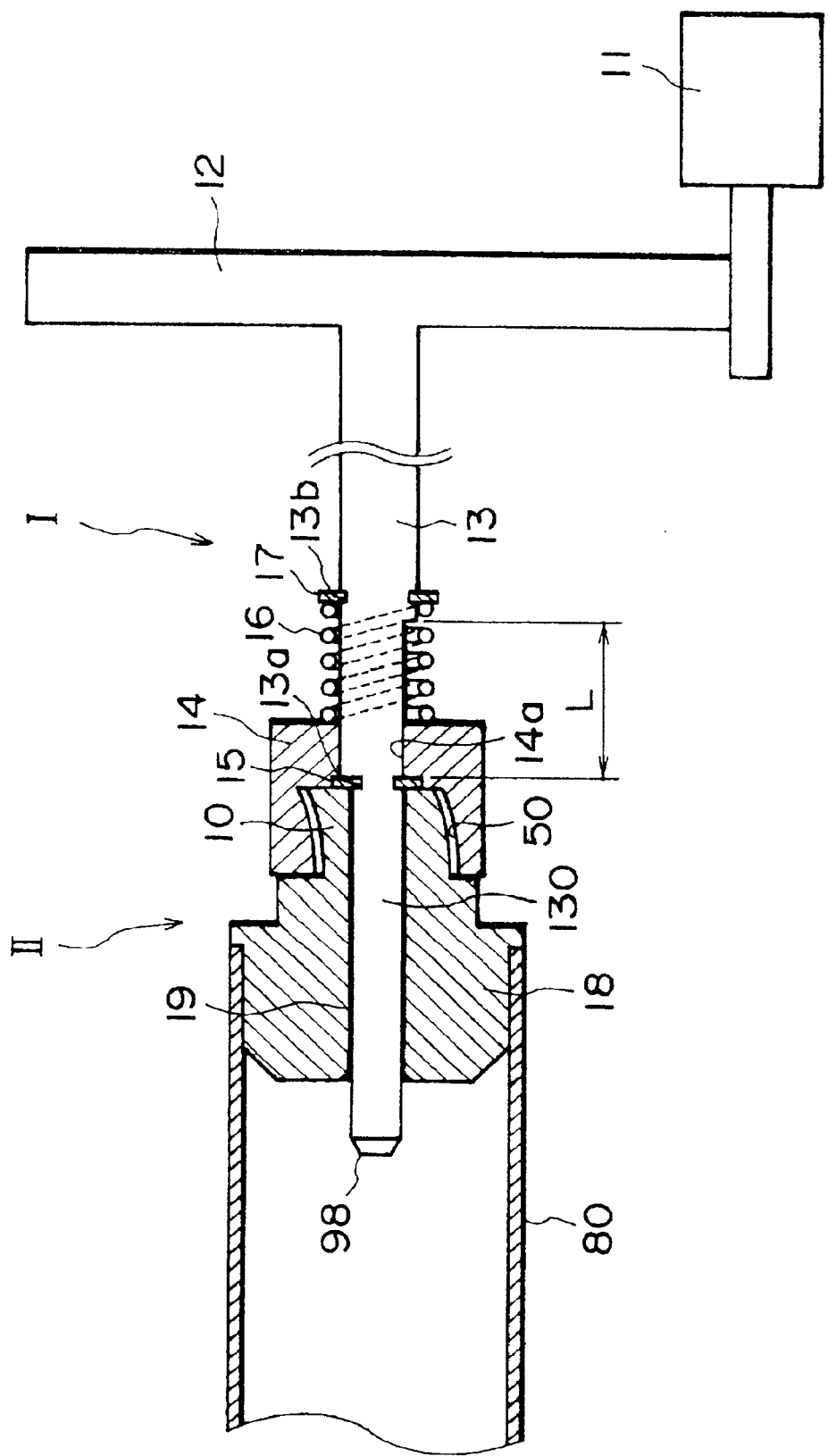
FIG. 3 is a sectional view of an example of a driving force transmission mechanism in accordance with the present invention.

Next, referring to FIG. 3, the driving system with which the main assembly of the image forming apparatus is provided will be described.

The driving system I comprises a motor 11, a driving gear 12, a gear shaft 13, and a second coupling portion 14, with which the apparatus main assembly is provided. As the driving gear 12 rotates by receiving a driving force from the motor 11 as a driving force source, the gear shaft 13 as an output shaft coaxial with the driving gear 12 rotates with the driving gear 12. The gear shaft 13 is put through a through hole 14a of the second coupling portion 14, doubling as the central shaft of the coupling. The portion L of the gear shaft 13, around which the second coupling portion 14 fits, and the through hole 14a of the second coupling portion 14, are both given a cross section in the form of D, that is, a shape formed by removing a segment of a substantial size from a disk, with the portion L fitted through the through hole 14a, so that the gear shaft 13 and second coupling portion 14 rotate together.

Figure 16:
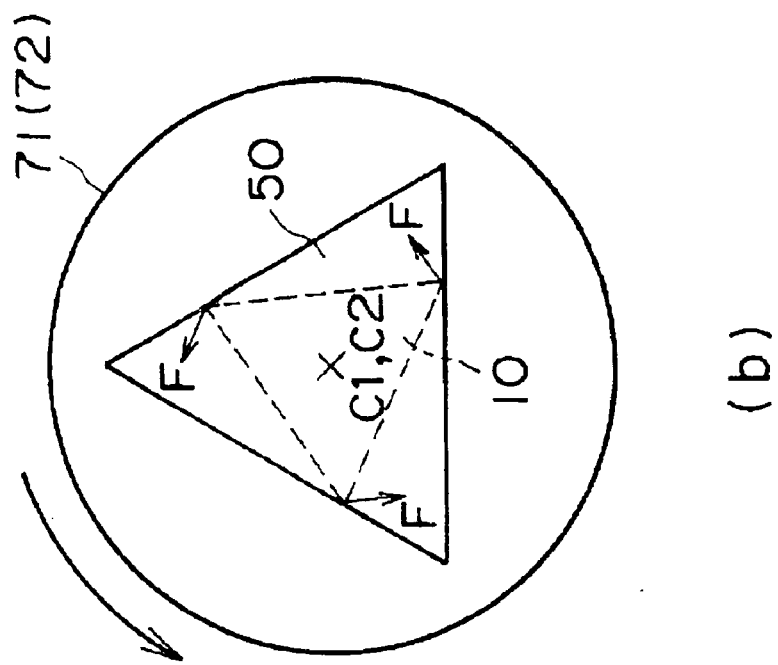
FIG. 16 is a drawing for describing how the female and male type portions of the coupling shown in FIG. 15 are automatically aligned with each other through their contact with each other.
Figure 16:
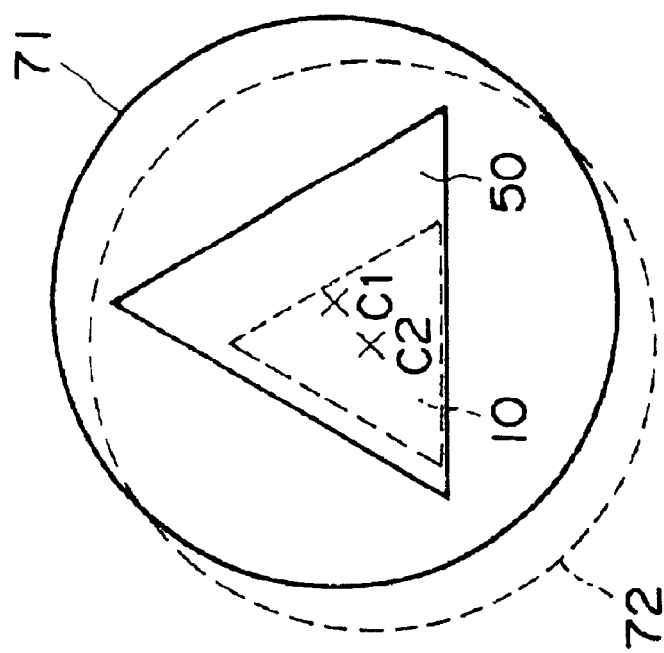

The second coupling portion 14 is provided with a hole 50, which is polygonal (for example, triangular as shown in FIG. 16) in cross section and is located on one end of the second coupling portion 14 in terms of the axial direction of the second coupling portion 14. After the second coupling portion 14 is attached to the gear shaft 13, the axial line of the hole 50 coincides with the rotational axis of the shaft 13. Placing the hole 50 in the second coupling portion 14 makes it easier to change the shape of the hole 50; the shape of the hole 50 can be changed by switching the second coupling 14. It also makes it possible to set the size of the hole 50 independently from the external diameter of the gear shaft 13.

The gear shaft 13 also is provided with two retainer ring grooves 13a and 13b, which are located in a manner to sandwich the second coupling portion 14, and in which retainer rings 15 and 17 in the form of a letter E are fitted one for one. The position of the second coupling portion 14 relative to the gear shaft 13 is fixed by the E-shaped retainer ring 15, or the retainer ring on the drum side. With this arrangement, the position at which the first coupling portion 10 in the form of a polygonal pillar, which will be described later, engages into the hole 50, is regulated. The E-shaped retainer ring 17, or the retainer ring on the driving gear side, constitutes a portion to which a spring 16 as a pressure generating member is anchored. As is evident from the above description, the spring 16 is fitted around the drive shaft 13, being sandwiched between the E-shaped retainer ring 17, or the retainer ring on the driving gear side, and the second coupling portion 14, and keeps the second coupling portion 14 pressed against the E-shaped retainer ring 15, or the retainer ring on the driving gear side. With this structural arrangement, the second coupling portion 14 is allowed to move in the axial direction of the gear shaft 13, and the female and male type portions of the coupling can be easily engaged with, or disengaged from, each other, by switching the rotational direction of the driving system I. Incidentally, instead of using the E-shaped retainer rings 15 and 17 by providing the driving shaft 13 with the retainer ring grooves 13a and 13b, the driving shaft 13 may be provided with collars, which are formed by increasing the diameter of the gear shaft 13 at specific portions.

Next, the driven system II, or the system to be driven by the driving system I, will be described. The photoconductive drum 80 (80Y, 80M, 80C and 80K) as a cylindrical member to be driven is provided with a pair of drum flanges, which are located at the lengthwise ends of the photoconductive drum 80, one for one. One of the drum flanges, which is unshown, rotationally supports the photoconductive drum 80. The other drum flange, or the drum flange 18, integrally comprises a first coupling portion 10, which is in the form of a polygonal pillar (for example, pillar having a cross section in the form of an equilateral triangle), and fits into the hole 50 of the second coupling portion 14. In other words, the hole 50 is used as one side of a coupling, and the first coupling 10 in the form of a polygonal pillar is used as the other side of the coupling.

The flange 18 is also provided with a through hole 19, which extends through the center of the flange 18, and through which the extension portion 130 (drum shaft portion) of the gear shaft 13, extending beyond the second coupling portion 14, is put. Putting the extension portion 130 of the gear shaft 13 through the through hole 19 assures that the photoconductive drum 80 is properly supported. The photoconductive drum 80 is set, as a part of a process cartridge, relative to the image forming apparatus main assembly, as described above, in other words, it is supported so that it can be mounted or dismounted for maintenance and/or replacement.

Here, the driven system II will described with reference to the case in which an equilateral triangle is selected as the cross sectional shape of the aforementioned hole 50 and coupling portion 10.

Figure 9:
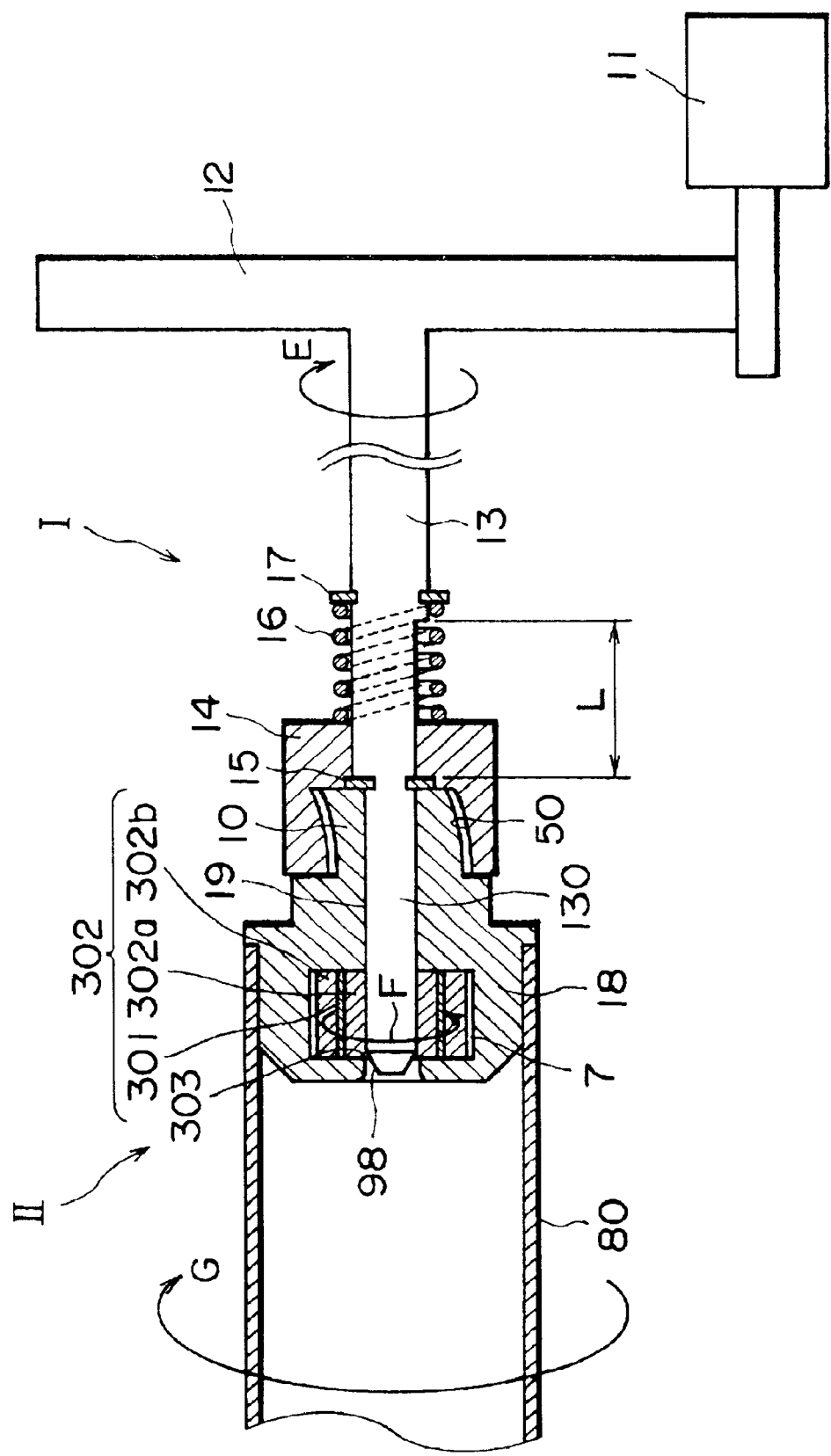
FIG. 9 is another example of a driving force transmission mechanism in accordance with the present invention.

The first coupling portion 10, or the projection on the driven system side, having a cross section in the form of an equilateral triangle, engages the hole 50 on the driving system side having a cross section in the form of an equilateral triangle (which hereinafter will be referred to as "engagement of male type coupling portion into female type coupling portion"). The driving gear 12, the gear shaft 13, and the second coupling portion 14 are rotated together by the driving force from the motor 11. During the engagement of the first coupling portion into the hole 50, the extension portion 130 of the gear shaft 13 fits into the hole 10 of the drum flange 18 (which hereinafter will be referred to as "engagement of shaft into hole"). The second coupling portion 14 is attached so that the axial line of the hole 50 coincides with the rotational axis of the gear shaft 13, and the axial line of the through hole 19, into which the extension portion 130 of the gear shaft 13 is put, is made to coincide with the axial line of the first coupling portion 10 in the form of a projection having a cross section in the form of an equilateral triangle. The cross section of the twisted hole 50, and the cross section of the first coupling in the form of the pillar having a cross section in the form of an equilateral triangle are similar to each other, being in the form of an equilateral triangle. Therefore, as the second coupling portion 14 is rotated, it comes into contact, and remains in contact, with the first coupling portion 10 at three points (as shown in FIG. 9). As a result, the photoconductive drum 80 is pulled in by the apparatus main assembly side, being fixed in position relative to the apparatus main assembly, and at the same time, the hole 50, and the first coupling portion 10 in the form of a polygonal pillar, are automatically aligned so that their axial lines coincide with each other. During this process, the aligned axial lines of the hole 50 and the first coupling portion 14 in the form of a pillar having a cross section in the form of an equilateral triangle, coincide with the rotational axis of the gear shaft 13. Therefore, the engagement of the shaft into the hole does not interfere with the automatic axial line aligning function of the coupling. Using the gear shaft 13 as a coupling shaft by putting it through the second coupling portion 14 improves the accuracy with which the axial lines of the driving system and driven system are aligned with each other.

The play between the flange 18 and the extension portion 130 of the gear shaft 13, that is, the play between the wall of the through hole 19 of the flange 18 and the peripheral surface of the extension portion 130 of the gear shaft 13, is made smaller than the play between the second coupling portion 14 and the first coupling portion 10, that is, the play between the wall of the hole 50 of the second coupling portion 14, and the lateral wall of the first coupling portion 10. As a result, the maximum amount of the play of the photoconductive drum in terms of its radius direction (which hereinafter will be referred to as "radial direction") is regulated by the amount of the play between the flange 18 and the extension portion 130 of the gear shaft 13, instead of the play between the second coupling portion 14 and the first coupling portion 10. Therefore, the displacement of the photosensitive drum 80 in the radial direction, which occurs as the photoconductive drum 80 is made to rotate faster than the normal speed, by an external disturbance such as the contact by the intermediary transfer belt 82 or the like, can be virtually eliminated by minimizing the play between the flange 18 and the extension portion 130 of the gear shaft 13, within a range in which the reduction of the play between the flange 18 and the extension 130 of the gear shaft 13 does not interfere with the rotation of the photoconductive drum 80. In other words, the alignment accuracy between the axial line of the photoconductive drum 80 and the axial line of the driving shaft 13 can be maintained by minimizing the play between the flange 18 and the extension portion 130 of the gear shaft 13. Further, the play between the first and second coupling portions 14 and 10 in terms of their radial directions may be increased. Therefore, ease of the engagement of the first coupling portion 10 in the form of a polygonal pillar into the hole 50 can be improved by increasing the play between the first and second coupling portions 14 and 10, to improve the cartridge in terms of operability.

Further, the end of the extension portion 130 of the gear shaft 13 may be tapered (portion 98 in FIG. 8) so that the tapered portion 98 guides the extension portion 130 to make it easier for the extension portion 13 to slip into the through hole 19.

Although the first coupling portion 10 in this embodiment is in the form of a simple polygonal pillar, a first coupling portion may be in the form of a twisted polygonal pillar, the twist angle of which is the same as that of the hole 50. In such a case, the contact, that is, interface, between the two coupling portions will be in the form of a twisted line, instead of a point, having a greater contact size. Therefore, the force with which the photoconductive drum is pulled in, that is, the force which keeps the two shafts connected, is greater.

In this embodiment, the driving force transmission mechanism in accordance with the present invention was described as the driving force transmission mechanism for transmitting the driving force to the photoconductive drum of an image forming apparatus. However, it can be used as a driving force transmission mechanism for a rotational member other than the photoconductive member of an image forming apparatus.

Also in this embodiment, the structural arrangement is such that the driving force from the motor 11 is transmitted through the driving gear 12. However, the output shaft of the motor 11 may be directly connected to the gear shaft 13 without interposing the driving gear 12.

Further, in this embodiment, the first coupling portion 10 in the form of a polygonal pillar is on the driven side, and the second coupling portion with the coupling hole 50 is on the driving side. However, the drum flange 18 on the driven side may be provided with the coupling hole 50 while placing the first coupling 10 in the form of a polygonal pillar on the driving side. Such an arrangement can provide the same effects as those provided by the arrangement in this embodiment.

Embodiment 2

Next, the second embodiment of the present invention will be described with reference to FIG. 4.

In the first embodiment, the extension portion 130 of the gear shaft 13 is used as the shaft for the shaft-hole engagement. However, in this embodiment, the shaft used for the shaft-hole engagement is rendered independent from the gear shaft 13.

Figure 4:
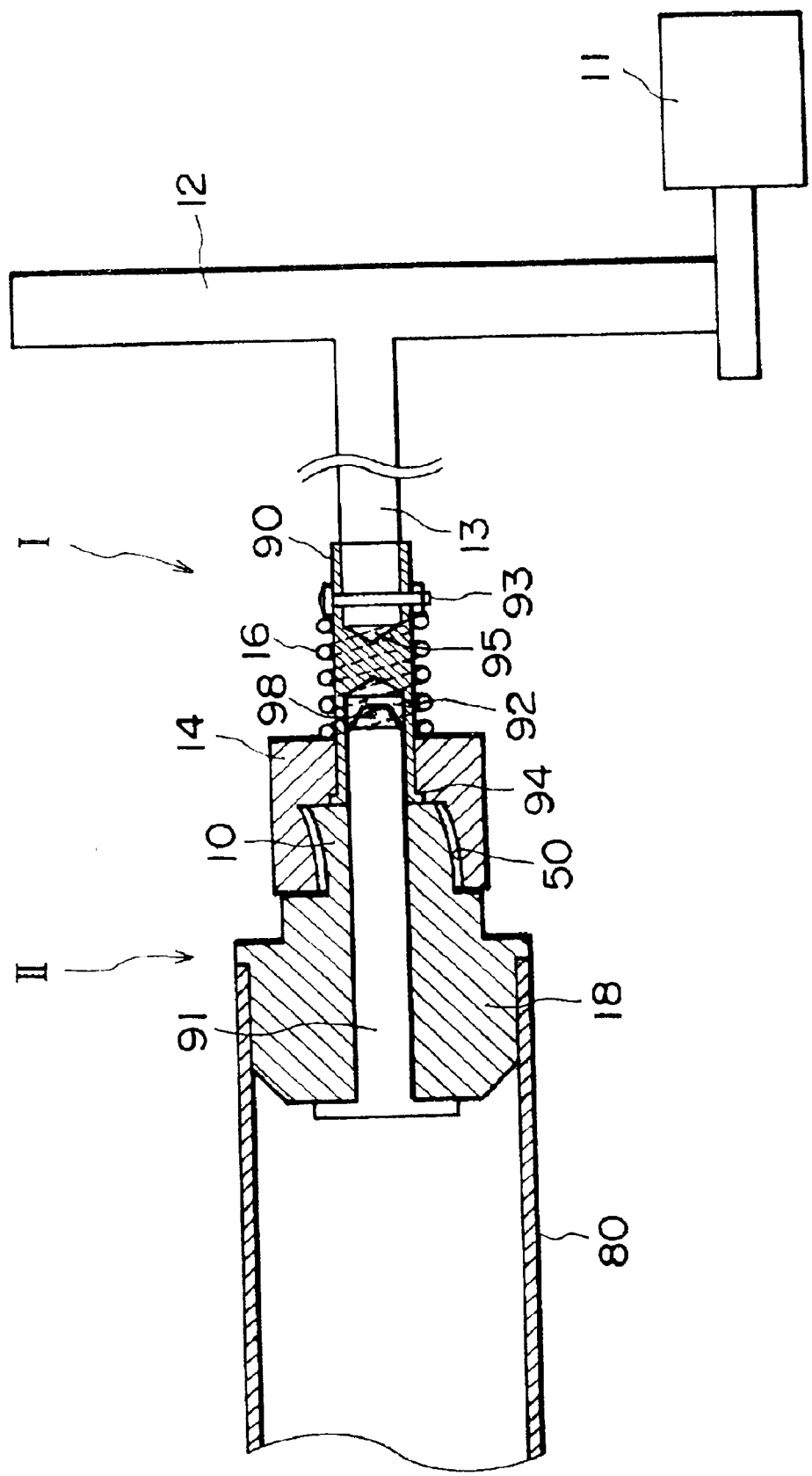
FIG. 4 is a sectional view of another example of a driving force transmission mechanism in accordance with the present invention.

Referring to FIG. 4, a driving system I comprises a motor 11, a driving gear 12, a gear shaft 13, and a second coupling portion 14. The second coupling portion 14 and gear shaft 13 are connected by a connecting member 90, and the second coupling portion 14 is attached to the drum side end portion of the connecting member 90, and connecting member 90 functions as the center shaft for the second coupling portion 14. One end of the connecting member 90 is provided with a hole 92, and a collar 94, which are located at the drum side end to accurately position the second coupling member 14, whereas the other end of the connecting member 90 is provided with a hole 95, into which the gear shaft 13 engages. The connecting member 90 is held to the gear shaft 13 with the use of a retainer 93 or the like. The connecting member 90 is in the form of a letter D, like a figure formed by removing a segment of a substantial size from a disk, so that the second coupling portion 14 rotates with the connecting member 90.

The second coupling portion 14 in this embodiment is provided with a hole 50 as is the second coupling portion 14 in the first embodiment. The hole 50 is polygonal in cross section, and is located at the end of the second coupling portion 14, on the photoconductive drum 80 side. Here, the driving gear 12, the gear shaft 13, and holes the 92 and 50, coincide in an axial line, and rotate together. The second coupling 14 is kept under the pressure generated by a spring 16, and is allowed to move in its axial direction, as is the second coupling 14 in the first embodiment.

On the other hand, the driven system II is a process unit removably mountable in the image forming apparatus main assembly. The process unit comprises a photoconductive drum 80, each end of which is fitted with a drum flange. The drum flange 18, that is, the one which faces the hole 50, is integral with a first coupling portion 10, which is in the form of a polygonal pillar and engages into the hole 50. The drum flange 18 is also provided with a shaft 91, which engages into the hole 92 of the connecting member 90, which coincides in axial line with the first coupling portion 10 in the form of a polygonal pillar. A part of the shaft 91 protrudes from the end surface of the first coupling portion 10 in the form of a polygonal pillar. The length of this protruding portion of the shaft 91 is rendered less than the depth of the hole 92 so that the position of the photoconductive drum 80 relative to the apparatus main assembly in terms of its axial direction becomes fixed as the end surface of the first coupling portion 10 in the form of a polygonal pillar comes into contact with the bottom surface of the hole 50 as the photoconductive drum 80 is pulled into the apparatus main assembly. The shaft 91 is fixed to the drum flange 18 by being pressed into the drum flange, or with the use of adhesive, and rotates with the photoconductive drum 80. Further, the play in the engagement of the shaft 91 into the hole 92 is rendered smaller than the play in the engagement of the male type coupling portion into the female type coupling portion, as in the first embodiment.

Also as in the first embodiment, with the provision of the above described structural arrangement, the displacement of the photoconductive drum 80 in the radial direction, which occurs as the photoconductive drum 80 is made to rotate faster than the normal speed, by an external disturbance such as the contact by the intermediary transfer belt 82 or the like, is virtually eliminated. Thus, the alignment accuracy between the axial line of the photoconductive drum 80 and the axial line of the driving shaft 13 is maintained, minimizing the reduction of driving force transmission accuracy. Further, the end of the shaft 91 may be tapered (portion 98) so that the tapered portion 98 guides the shaft 91 to make it easier for the shaft 91 to slip into the hole 92, during the mounting of the process unit.

Making the coupling shaft separated from the shaft on the driving side, as is the shaft 91 in this embodiment, makes it possible to use a substance superior in slidability and strength as the material for the coupling shaft. Further, it allows the coupling shaft to be switched, and therefore, the amount of the play in the shaft-hole engagement can be easily changed or adjusted by switching the coupling shaft.

Although the shaft 91 in this embodiment is made to protrude from the first coupling 10 in the form of a polygonal pillar, a shaft 91 may be made to protrude from the bottom surface of the hole 50 of the second coupling portion. Such a structural arrangement can also provide the same effects as those obtained by the structural arrangement in this embodiment.

The first coupling portion in this embodiment, in the form of a polygonal pillar, may be in the form of a twisted polygonal pillar, the twist ratio of which is the same as that of the hole 50, as in the first embodiment.

Although in this embodiment, the first coupling portion 10, in the form of a polygonal pillar, is on the driven side, and the second coupling portion with the hole 50 is on the driving side, their positions may be reversed; even if their positions are reversed, the same effects as those provided in this embodiment can be obtained.

As described above, in a driving force transmission mechanism, a process unit, and an image forming apparatus, which are in accordance with the present invention, a cylindrical member can be connected to, or disconnected from, a driving system through the engagement of the polygonal projection of a coupling portion into a polygonal hole of another coupling portion. The driving force from the driving system is transmitted through a plurality of interfaces, in the form of a point or a line, between the polygonal projection of a coupling portion, and the walls of the polygonal hole of another coupling portion, when the two coupling portions are engaged. Either the coupling portion with the polygonal projection or the coupling portion with the polygonal hole is provided with a shaft which protrudes in the axial direction of the coupling, and the coupling portion which is not provided with the protruding shaft is provided with a hole into which the protruding shaft engages. Therefore, even if the contact between the first and second coupling portions is disturbed as the cylindrical member is made to rotate faster than the normal speed by an external force other than the force which the driven side receives from the driving side, the cylindrical member on the driven side remains stably supported. Further, the alignment accuracy between the driving and driven sides can be maintained regardless of the play between the female and male type coupling portions, that is, the first and second coupling portions, in terms of their radial direction. Therefore, it is possible to reduce color deviation to provide a high quality image.

Embodiment 3

Figure 5:
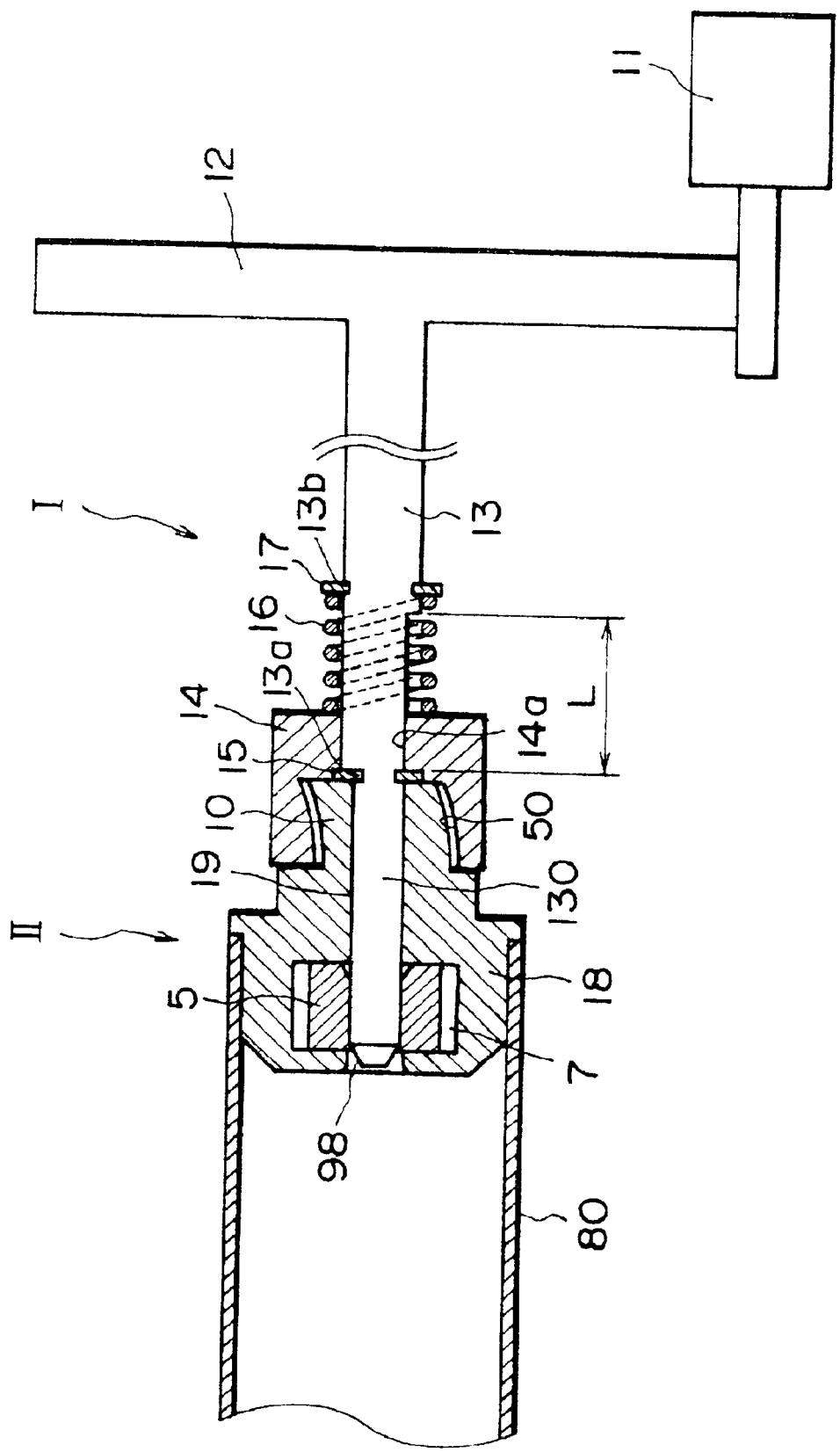
FIG. 5 is a sectional view of another example of a driving force transmission mechanism in accordance with the present invention.
Figure 6:
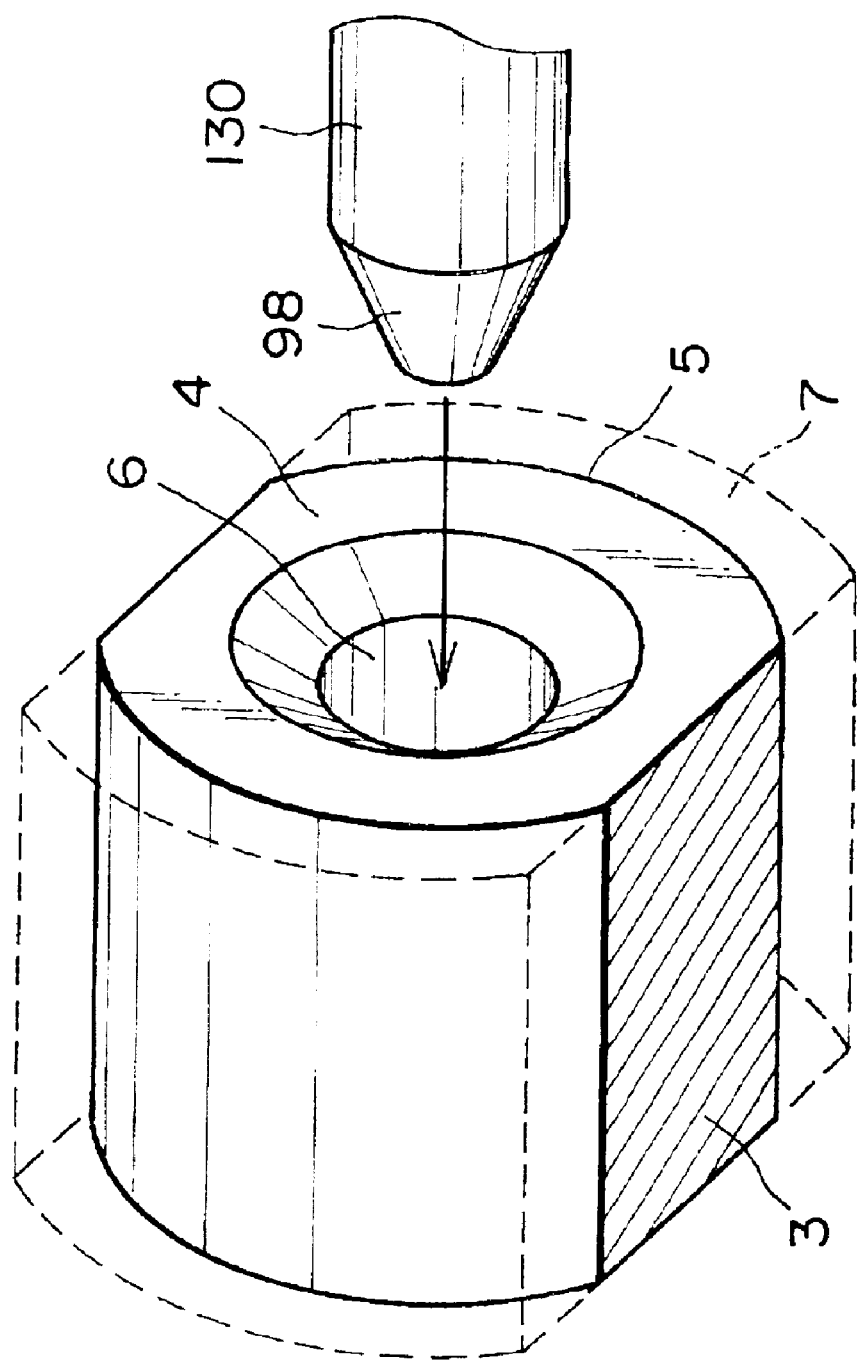
FIG. 6 is a perspective view of the elastic member in the driving force transmission mechanism shown in FIG. 3.

Next, referring to FIG. 5, the third embodiment of the present invention will be described. A drum flange 18 is provided with a cylindrical elastic member 5 as a braking member, which is formed of rubber or the like. Referring to FIG. 6, the details of the elastic member 5 will be described. The elastic member 5 is provided with a center hole 6, which is a through hole, into which the extension portion 130 of a gear shaft 13 is engaged. The gear shaft 13 also constitutes the central shaft of the coupling. The internal diameter of the hole 6 is smaller than that of the through hole 19 of the drum flange 18, which extends in the axial direction of the drum flange 18 inclusive of the first coupling portion 10, that is, a projection in the form of a polygonal pillar; the internal diameter of the hole 6 is such that when the extension portion 130 of the gear shaft 13 is in the through hole 19, there is no play between the drum flange 18 and the extension portion 130 of the gear shaft 13. With the provision of this structural arrangement, as the extension portion 130 of the gear shaft 13 is engaged into the hole 6 of the elastic member 5, it is constricted by the elastic member 5 because of the resiliency of the elastic member 5. Thus, when the photoconductive drum 80 is subjected to an external force, for example, the force generated by the friction from an intermediary transfer belt 82, the external force is canceled by the friction between the extension portion 130 of the gear shaft 13 and the wall of the hole 6, and therefore, the state of the contact between the female and male type coupling portions remains normal.

The amount of the friction between the extension portion 130 of the gear shaft 13 and the wall of the hole 6 is determined by two values: the value of the coefficient of the friction between the extension 130 of the gear shaft 13 and the elastic member 5, and the value of the resiliency of the elastic member 5. The two values are set so that the amount of the friction between the extension 130 of the gear shaft 13 and the wall of the hole 6 succumbs to the torque of the gear shaft 13 as an output shaft, but overcomes the external force (for example, the force generated by the friction between the photoconductive drum 80 and intermediary transfer belt 82) which acts upon the photoconductive drum 80. With such an arrangement, the friction, which functions as braking force, does not become a hindrance to the normal coupling movement of the first coupling portion 10 in the form of a polygonal pillar into the hole 50 of the second coupling portion, which is polygonal in cross section, and also keeps the first and second coupling portions normally coupled. Therefore, while the photoconductive drum 80 is driven, the driving system remains always property aligned with the photoconductive drum 80.

Also referring to FIG. 6, the edge of the opening of the hole 6, into which the extension portion 130 of the gear shaft 13 is inserted, is tapered, creating a tapered portion 4. This tapered portion 4 functions as a guide for guiding the extension portion 130 of the gear shaft 13 when the extension portion 130 of the gear shaft 13 is inserted into the hole 6. It also prevents the elastic member 5 from being separated from the drum flange 18 by the extension portion 130 of the gear shaft 13.

Further, in order to prevent the elastic member 5 from rotating relative to the drum flange 18, the elastic member 5 is provided with a flat portion, which is formed by removing the portions of the elastic member 5, equivalent to a segments of a disk. Providing the elastic member 5 with a pair of flat portions 3 parallel to each other as shown in FIG. 6 makes it possible to regulate the elastic member 5 so that the elastic member 5 is allowed to move in the specified direction only. In such a case, the drum flange 18 is provided with a hole 7, the cross section of which is in the form of an elongated hole, and the elastic member 5 is fitted in the hole 7, with the provision of play only in the direction parallel to the long axis of the cross section of the hole 7.

With the provision of the above-described structural arrangement, as the tapered portion 98 at the end of the extension portion 130 comes into contact with the tapered portion 4 of the hole 6 during the insertion of the extension portion 130 of the gear shaft 13 into the hole 6, the position of the elastic member 5 is automatically adjusted so that the extension 130 of the gear shaft 13 fits into the hole 6. In other words, the extension portion 130 of the gear shaft 13, through hole 19, and hole 6 of the elastic member 5, coincide in an axial line and such problems as the misalignment between the driving side and driven side of the coupling are prevented. Further, the play between the elastic member 5 and the wall of the hole 7 with a cross section in the form of an elongated hole is such that the elastic member 5 is allowed to move only in a direction parallel to the long axis of the cross section. Therefore, the elastic member 5 rotates with the drum flange 18, without any play in terms of its rotational direction.

Referring again to FIG. 5, the elastic member 5 is positioned as far as possible from the polygonal projection 10. More concretely, the elastic member 5 is positioned so that the extension portion 130 of the gear shaft 13 is inserted into the hole 6 of the elastic member 5 after the engagement of the first coupling portion 10 in the form of a polygonal pillar into the hole 50 which is polygonal in cross section. With this structural arrangement, the resistance a user feels when inserting the extension portion 130 of the gear shaft 13 into the hole 6 is smaller; the resistance a user feels when inserting the extension portion 130 of the gear shaft 13 can be utilized as a means for assuring the user that the polygonal projection 10 is being properly set relative to the polygonal hole 50.

Although the first coupling portion in this embodiment is in the form of a simple polygonal pillar, a first coupling portion may be in the form of a twisted polygonal pillar, the twist angle of which is the same as that of the hole 50 with a polygonal cross section. Such a modification changes the state of the contact (interface) between the two coupling portions during driving force transmission, from a point to a twisted line. In other words, it increases the size of the interface between the two coupling portions, increasing the force generated by the contact between the two coupling portions in the direction to pull the photoconductive drum toward the apparatus main assembly, and therefore, increases the force which keeps the two shafts properly connected.

Further, in this embodiment, the first coupling portion 10 in the form of a polygonal pillar is disposed on the driven system side, and the hole 50 with a polygonal cross section is disposed on the driving system side. However, the present invention is also applicable to a structural arrangement that is reverse to the structural arrangement in this embodiment, that is, a structural arrangement in which the hole 50 with a polygonal cross section may be provided in the drum flange 18, while disposing the first coupling portion 10 in the form of a polygonal pillar on the driving system side. Such a modification can provide the same effects as those provided by the arrangement in this embodiment.

Further, in this embodiment, the gear shaft 13 itself, more precisely, its extension portion 130 itself, is used as a coupling shaft. However, instead of using the extension portion 130 of the gear shaft 13 as a coupling portion shaft, a shaft, which is independent from the gear shaft 13, but is made to rotate with the gear shaft 13, may be provided as a coupling shaft. When a coupling shaft independent from the gear shaft 13 is employed, the side on which the coupling shaft is disposed may be either of the first coupling portion 10 in the form of a polygonal pillar or the second coupling portion with the hole 50 polygonal in cross section.

In the above description of this embodiment, the embodiment was described with reference to a driving force transmission mechanism for a photoconductive drum. However, this embodiment of the present invention can be used as a driving force transmission mechanism for transmitting a driving force to rotational members other than a photoconductive drum.

Also in this embodiment, a combination of a portion with a polygonal hole and a portion with a projection in the form of a polygonal pillar is employed as an essential portion of the driving force transmission mechanism. However, the combination does not need to be limited to the one in this embodiment. In other words, this embodiment is applicable to any driving force transmission mechanism, the coupling of which comprises female and male type portions, which are engaged with, or disengaged from, each other; the effects of such an application will be the same as those provided by this embodiment.

Embodiment 4

Figure 7:
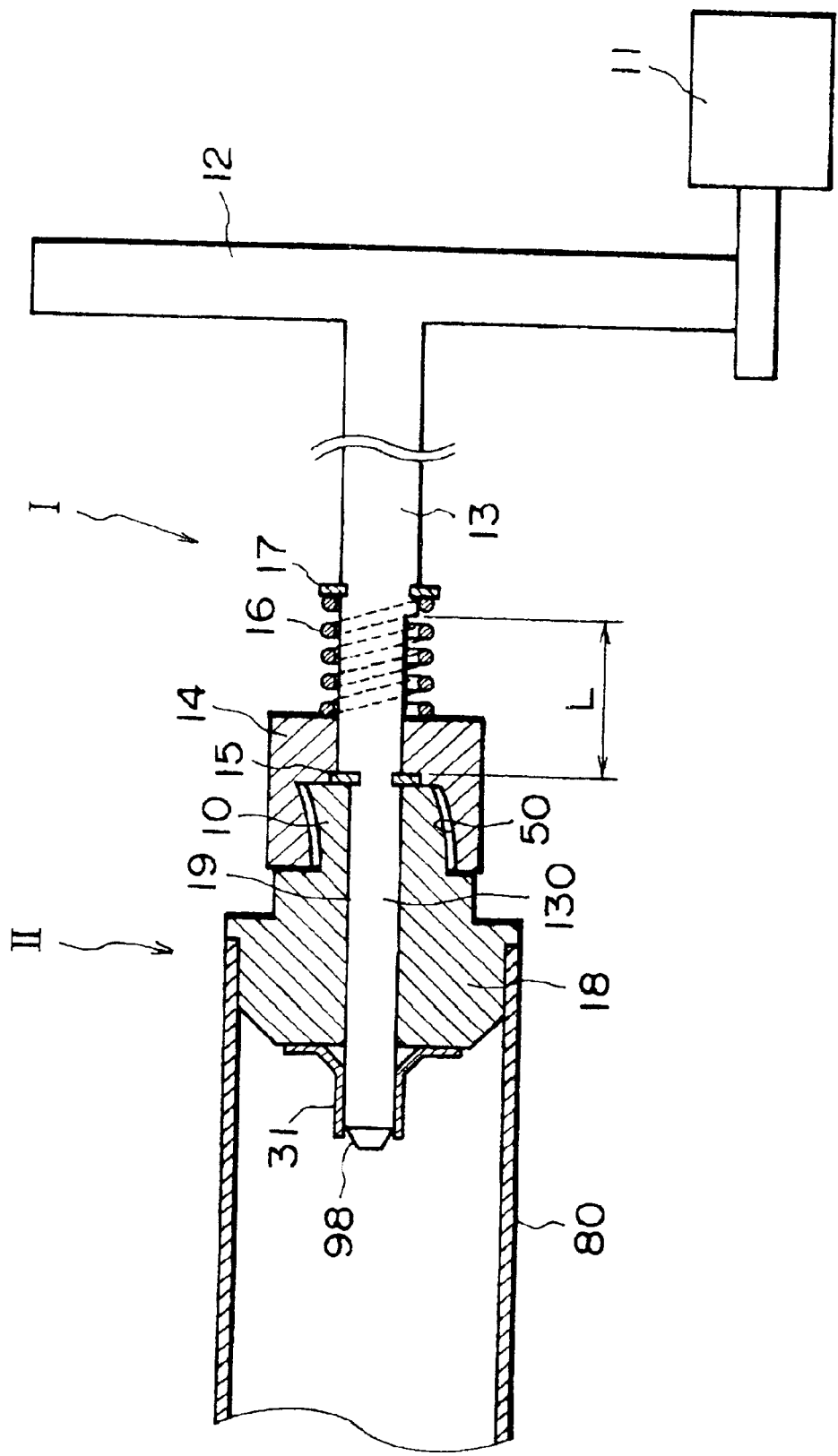
FIG. 7 is another example of a driving force transmission mechanism in accordance with the present invention.

Next, referring to FIG. 7, the fourth embodiment of the present invention will be described. In this embodiment, friction is used as braking force.

A driven system II is a process unit, which comprises a photoconductive drum 80, and is removably mountable in the main assembly of an image forming apparatus. The photoconductive drum 80 is fitted with a pair of drum flanges, which are located at its lengthwise ends, one for one. Of the two flanges, the drum flange 18, that is, the one which faces the hole 50 with a polygonal cross section, is integral with a first coupling portion 10 in the form of a polygonal pillar, which engages into the polygonal hole 50.

The drum flange 18 inclusive of the first coupling portion 10 in the form of a polygonal pillar is provided with a through hole 19, which extends in the axial direction of the drum flange 18 inclusive of the first coupling portion 10, and through which a gear shaft 13 is put. The axial line of the through hole 19 coincides with the axial line of the first coupling portion 10. The inward end of the drum flange 18 with respect to the photoconductive drum 80 is provided with a pair of elastic members 31, for example, springs, which are attached to the drum flange 18 in such a manner that as the extension portion 130 of the gear shaft 13 is put through the through hole 19, the resiliency of the elastic members 31 causes the elastic member 31 to press on the extension portion 130. The elastic member 31 is fixed to the drum flange 18 with the use of an unshown fixing means. With the provision of this structural arrangement, as a photoconductive drum 80 is subjected to an external force such as the force generated by the friction from an intermediary transfer belt 82, the external force is canceled by the friction between the extension portion 130 of the gear shaft 13 and the elastic members 31, and therefore, the female and male type coupling portions remain properly in contact with each other.

The amount of the friction between the extension portion 130 of the gear shaft 13, which also functions as the center shaft for the coupling, is set so that the friction succumbs to the torque of the gear shaft 13 as the output shaft, but overcomes an external force (for example, the force generated by the friction caused by the intermediary transfer belt 82) which acts upon the photoconductive drum 80. With this setup, the friction provided as a braking force does not interfere with the normal engagement of the first coupling portion 10 in the form of a polygonal pillar into the hole 50 with a polygonal cross section, and keeps the female and male type coupling portions properly in contact with each other. Thus, the photoconductive drum 80 is always driven by the driving system I in the normal state.

In this embodiment, two elastic members 31 are disposed in a manner to sandwich the extension portion 130 of the gear shaft 13. However, there is no restriction regarding the number and position of the elastic members 31.

The driving force transmission mechanism in this embodiment is structured so that the extension portion 130 of the gear shaft 13 comes into contact with the elastic members 31 after the engagement of the first coupling portion 10 in the form of a polygonal pillar into the hole 50 with a polygonal cross section. Such a structural arrangement can reduce the resistance felt by a user as the extension portion 130 of the gear shaft 13 comes into contact with the elastic members 31, and the resistance felt by a user may be taken as an assurance that the polygonal projection 10 is being properly set relative to the polygonal hole 50.

Incidentally, in this embodiment, the first coupling portion is in the form of a simple polygonal pillar. However, it may be in the form of a projection in the form of a twisted polygonal pillar, the twisted angle of which is the same as that of the hole 50, as is in the first embodiment. Further, regarding the side on which the first coupling portion 10 in the form of a polygonal pillar or the second coupling portion 14 with the hole 50 with a polygonal cross section is disposed, instead of disposing the first coupling portion 10 on the drum flange side, and the second coupling portion 14 on the gear shaft side, the first coupling portion 10 may be disposed on the gear shaft side while disposing the second coupling portion 14 on the drum flange side, as may be done in the first embodiment. The reversal positioning of the first and second coupling portions 10 and 14 provides the same effects as the original positioning.

Further, in this embodiment, the gear shaft 13 itself, more precisely, its extension portion 130 itself, is used as a coupling shaft. However, instead of using the extension portion 130 of the gear shaft 13 as a coupling shaft, a shaft, which is independent from the gear shaft 13, but is made to rotate with the gear shaft 13, may be provided as a coupling shaft, as is in the modification of the first embodiment.

In the above description of this embodiment, a member having a twisted hole with a polygonal cross section, and a projection in the form of a polygonal pillar, are used as the driving force transmitting side and driving force receiving side, respectively, of the driving force transmission mechanism. However, the driving force transmitting side and the driving force receiving side of a driving force transmission mechanism do not need to be in the form of those in this embodiment. The same effects as those provided by this embodiment can be obtained as long as a driving force transmission mechanism employs a combination of female and male type coupling portions as a means for engaging the driving system and driven system, and keeping them properly in contact with each other.

Embodiment 5

Next, referring to FIG. 8, the fifth embodiment of the present invention will be described. In this embodiment, a magnetic force is used as braking force. The driving system and driven system in this embodiment are virtually the same as those in the third embodiment. Therefore, their detailed description will be omitted, and only the portions different from those in the third embodiment will be described.

Figure 8:
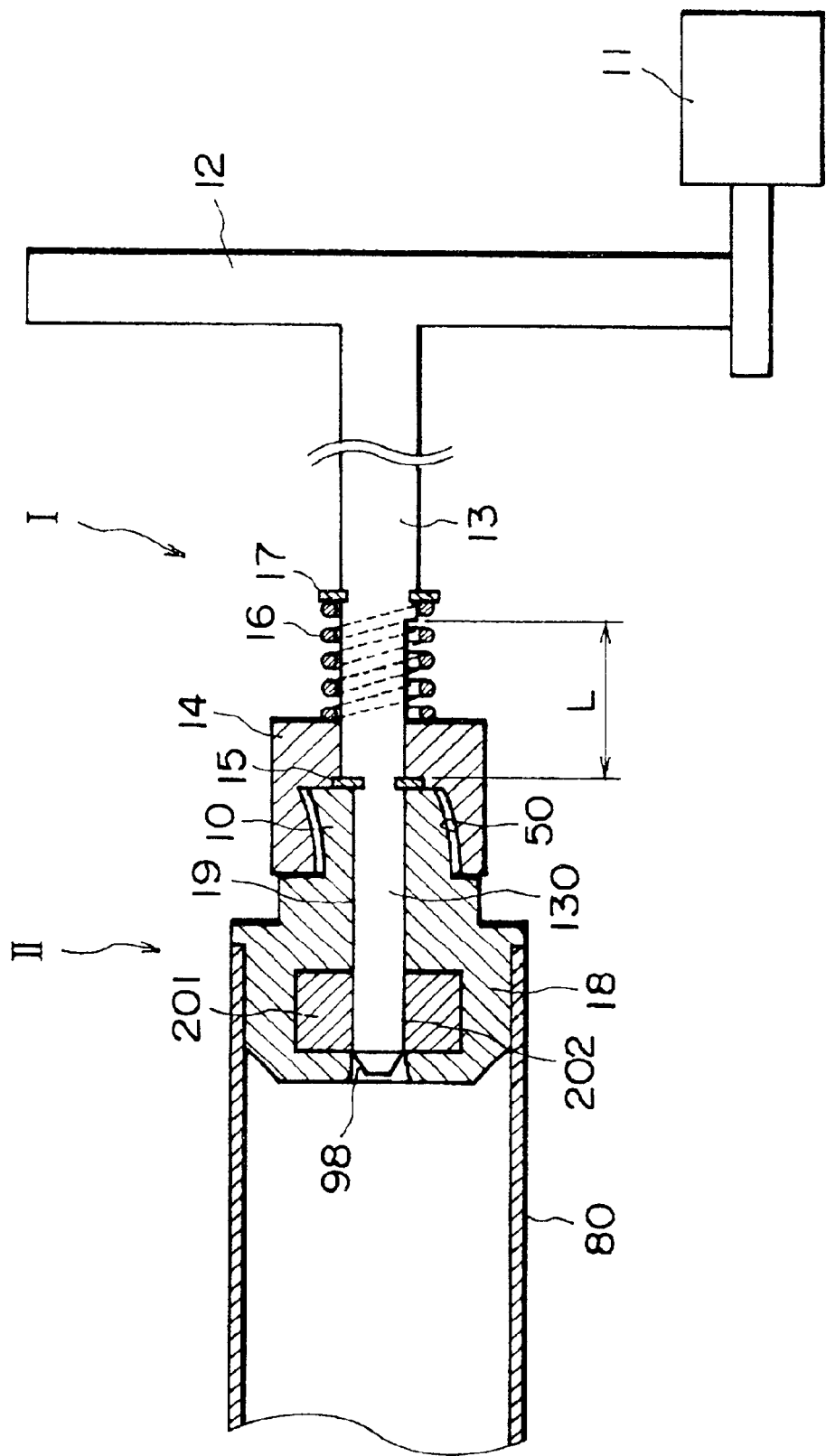
FIG. 8 is another example of a driving force transmission mechanism in accordance with the present invention.

Referring to FIG. 8, a drum flange 18 has a cylindrical magnetized member 201, which is disposed within the hollow of the drum flange 18. The magnetized member 201 is provided with a through hole 202, the axial line of which coincides with that of the magnetized member 201, and in which the extension portion 130 of a gear shaft 13 is fitted. The diameter of the hole 202 may be larger than the external diameter of the extension portion 130 of the gear shaft 13; more precisely, it may be large enough to provide a certain amount of play between the wall of the hole 202 and the extension portion 130 of the gear shaft 13. On the other hand, a gear shaft 13 is formed of magnetic substance.

With the provision of the above described structural arrangement, the extension portion 130 of the gear shaft 13 is magnetized by the magnetized member 201, and therefore, the portion of the extension portion 130 of the gear shaft 13 facing the magnetized member 201 is magnetized to the polarity opposite to the polarity of the portion of the magnetized member 201 facing the extension portion 130 of the gear shaft 13. As a result, the magnetic force acting between the extension portion 130 of the gear shaft 13 and the wall of the hole 202 acts in a manner to brake the extension portion 130 of the gear shaft 13. Thus, as an external force, for example, the force generated by the friction from an intermediary transfer belt 82, acts upon a photoconductive drum 80, the external force is canceled by the magnetic force acting between the extension portion 130 of the gear shaft 13 and the wall of the hole 202, and therefore, the state of the contact between the female and male coupling portions is kept normal.

Here, the magnetic force acting between the extension portion 130 of the gear shaft 13 is set within a range in which it succumbs to the torque of the gear shaft 13 as the output shaft, but overcomes the external force (for example, the force generated by the friction caused by the intermediary transfer belt 32) which acts upon the photoconductive drum 80.

With the provision of the above described structural arrangement, the magnetic force provided as braking force can keep the coupling portion with the hole 50 with a polygonal cross section, normally in contact with the first coupling portion 10 in the form of a polygonal pillar, without interfering with the normal engagement of the first coupling portion 10 into the hole 50. Therefore, the photoconductive drum 80 is always driven by the driving system properly connected to the photoconductive drum 80.

Although the magnetized member 201 in this embodiment is in the form of a cylindrical member with a through hole (202), the configuration and position of the magnetized member 201 does not need to be limited to those in this embodiment, as long as they provide magnetic attraction, or braking force, between the magnetized member 201 and the extension portion 130 of the gear shaft 13.

Further, the magnetized member 201 is provided with a portion which prevents the magnetized member 201 from rotating relative to the drum flange 18. This portion of the magnetized member 201 is the same in configuration as the rotation preventing portion of the elastic member 5 shown in FIG. 6, for example.

The polygonal projection in this embodiment may be in the form of the twisted polygonal projection in the first embodiment, the twist angle of which is the same as that of the hole 50 with a polygonal cross section. Regarding the side between the driving system and driven system the projection 10 in the form of a polygonal pillar and the hole 50 with a polygonal cross section, are disposed, they can be disposed on either side, one for one, as in the first embodiment. Even if their positions are reversed from those in this embodiment, the same effects as those provided by this embodiment will be obtained.

Further, in the fifth embodiment, the gear shaft 13 itself, more precisely, the extension portion 130 of the gear shaft 13, is used as the central shaft for the coupling. However, a magnetic shaft, which is independent from the gear shaft 13, but rotates with the gear shaft 13, may be employed as the coupling shaft.

In the above described embodiment, the female type portion with a twisted hole with a polygonal cross section, and male type portion with a projection in the form of a polygonal pillar, are chosen as the two sides of the coupling of the driving force transmission mechanism. However, the same effects as those provided by this embodiment can be obtained as long as the coupling of a driving force transmission mechanism employs female and male type portions which can be engaged with, disengaged from, or kept in contact with, each other.

Embodiment 6

Next, referring to FIG. 9, the sixth embodiment of the present invention will be described. In this embodiment, the braking force acts only in one direction. The driving system I is the same in structure as that in the first embodiment, and therefore, its details will not be described here. Further, the driven system II is virtually the same as that in the third embodiment, and therefore, only the portions of the driven system II different from those in the third embodiment will be described.

Referring to FIG. 9, a drum flange 18 has a cylindrical member 302, which is within the hollow of the drum flange 18. The cylindrical member 302 has a three-layer structure, comprising an innermost member 302a, a one-way clutch 301, and an outermost member 302b, which have been listed from the central shaft side. The innermost member 302a is provided with a center hole 303, into which the extension portion 130 of a gear shaft 13 engages. The relationship between the diameter of the hole 303 and the external diameter of the extension portion 130 of the gear shaft 13 is such that it leaves no play between the wall of the hole 303 and the extension portion 130 of the gear shaft 13. The gear shaft 13 and innermost member 302a are enabled to rotate together. On the other hand, the outermost member 302b is provided with such a mechanism that prevents the rotation of the outermost member 302b, while providing the outermost member 302b with directional play (FIG. 6).

With the provision of the above described structural arrangement, it becomes possible for the position of the cylindrical member 303 to be automatically adjusted as the extension portion 130 of the gear shaft 13 is inserted into the hole 303. Therefore, it is possible to prevent such a problem as the shaft to be driven becomes connected askew to the driving shaft. The one-way clutch 301 regulates the rotational direction of the gear shaft 13 so that the gear shaft 13 is allowed to rotate in the driving direction (direction of an arrow mark E). In other words, control is executed so that the outermost member 302b rotates in the direction of an arrow mark F relative to the innermost member 302a which rotates with the gear shaft 13. That is, the direction in which the driven side is allowed to rotate is such that the innermost member 302a and outermost member 302b are sheared from each other in the directions of the arrow marks E and F, respectively, as if the one-way clutch 301 is the shearing line.

On the contrary, the direction in which the photoconductive drum 80 is made to rotate faster than the normal speed, by an external force, such as the force generated by the friction between the photoconductive drum 80 and the intermediary transfer belt 82, is the direction indicated by an arrow mark G. The outermost member 302b rotates with the drum flange 18. Therefore, as an external force acts on the photoconductive drum 80 in the direction to rotate the photoconductive drum 80 faster than the normal speed in the direction of the arrow mark G, the external force also acts upon the outermost member 302b in the direction of the arrow mark G. In this case, however, the portions which rotate in the directions indicated by the arrow marks E and G, respectively, are not sheared from each other, unlike the portions which rotate in the directions indicated by the arrow marks E and F, respectively. Therefore, as external force acts upon the photoconductive drum 80 in the direction to rotate the photoconductive drum 80 faster than the normal speed, the braking force is applied by the one-way clutch 301. In other words, the structural arrangement in this embodiment cancels only the external force which acts upon the photoconductive drum 80 (for example, the external force generated by the friction from the intermediary transfer belt 82), and does not interfere with the normal contact between the second coupling portion with polygonal hole 50 and the first coupling portion 10 in the form of a polygonal pillar. Therefore, the female and male type portions of the coupling of the driving force transmission mechanism are kept normally in contact with each other. In other words, the photoconductive drum 80 is always driven by the driving system in the normal state of connection.

Further, the driving force transmission mechanism in this embodiment is structured so that the extension portion 130 of the gear shaft 13 engages into the hole 303 after the engagement of the first coupling portion 10 in the form of a polygonal pillar into the hole 50 with a polygonal cross section. Such a structural arrangement can reduce the resistance felt by a user as the extension portion 130 of the gear shaft 13 engages into the hole 303, and the resistance felt by a user when the process unit is mounted may be taken as an assurance that the polygonal projection 10 is being properly set relative to the polygonal hole 50.

Incidentally, in this embodiment, the first coupling portion is in the form of a simple polygonal pillar. However, it may be in the form of a projection in the form of a twisted polygonal pillar, the twist angle of which is the same as that of the hole 50 of the second coupling portion, the cross section of which is polygonal, as is in the first embodiment. Further, regarding on which side between the driving system and driven system the projection 10 in the form of a polygonal pillar and the hole 50 with a polygonal cross section, are disposed, they can be disposed on either side, one for one, as in the first embodiment. Even if their positions are reversed from those in this embodiment, the same effects as those provided by this embodiment will be obtained.

Further, in this embodiment, the gear shaft 13 itself, more precisely, its extension portion 130 itself, is used as the coupling shaft. However, instead of using the extension portion 130 of the gear shaft 13 as a coupling portion shaft, a shaft, which is independent from the gear shaft 13, but is made to rotate with the gear shaft 13, may be employed provided as a coupling shaft.

In the above described embodiment, the female type portion with a hole with a polygonal cross section, and male type portion with a projection in the form of a polygonal pillar, are chosen as the two sides of the coupling of the driving force transmission mechanism. However, the same effects as those provided by this embodiment can be obtained by the employment of the structural arrangement in this embodiment as long as the coupling of a driving force transmission mechanism employs female and male type portions which can be engaged with, and kept in contact with, each other.

Embodiment 7

Figure 10:
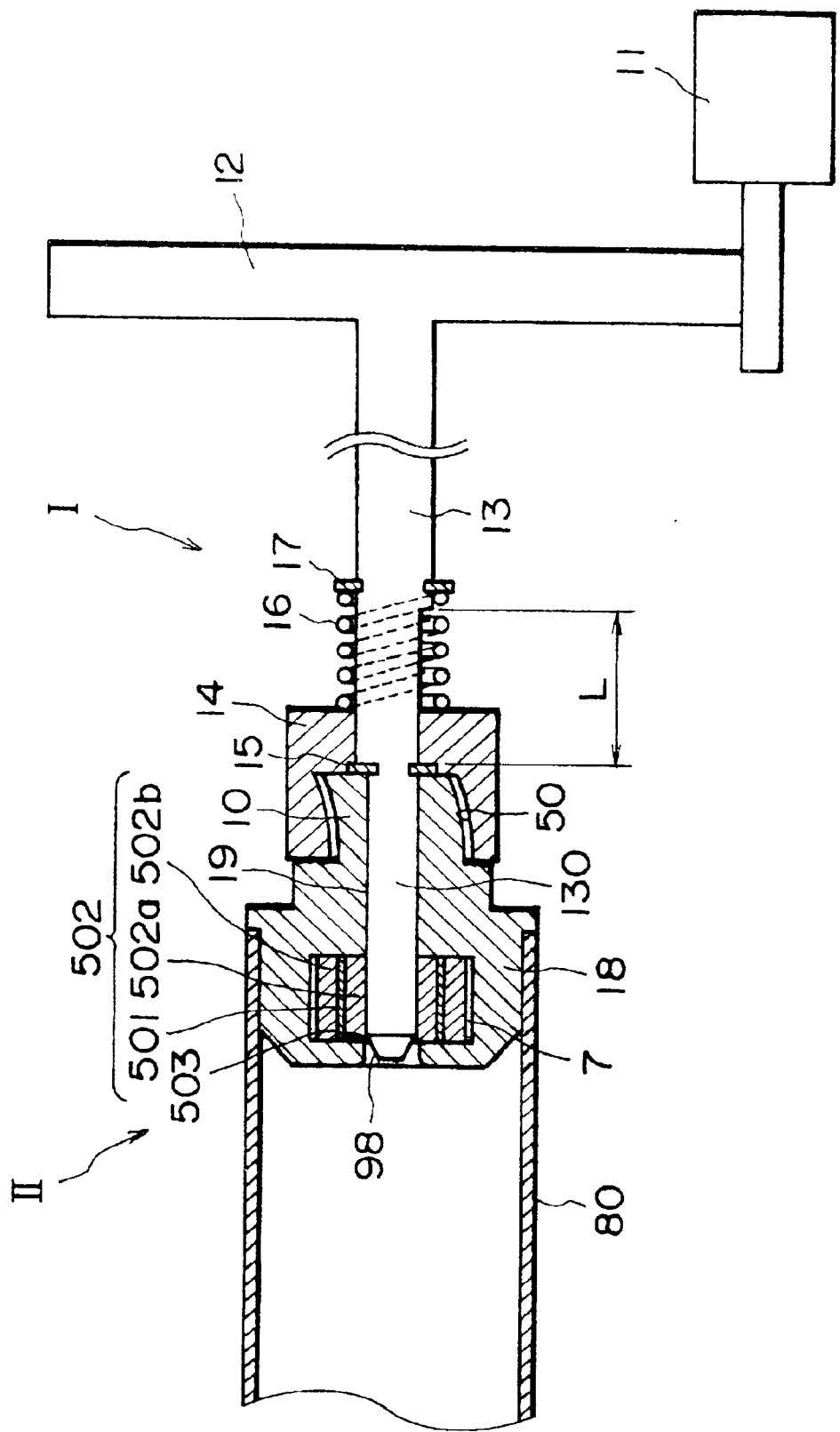
FIG. 10 is another example of a driving force transmission mechanism in accordance with the present invention.

Referring to FIG. 10, the seventh embodiment of the present invention will be described. In this embodiment, the braking force is provided with the use of a powder brake. The driving system I and driven system II in this embodiment are the same in structure as those in the sixth embodiment. Therefore, their detailed structures will not be described here, except for the portions different from those in the sixth embodiment.

Referring to FIG. 10, a drum flange 18 has a cylindrical member 502, which is in the hollow of the drum flange 18. The cylindrical member 502 has a three-layer structure, comprising an innermost member 502a, a powder brake 501, and an outermost member 502b, which have been listed from the central shaft side. The innermost member 502a is provided with a center hole 503, into which the extension portion 130 of a gear shaft 13 engages. The relationship between the diameter of the hole 503 and the external diameter of the extension portion 130 of the gear shaft 13 is such that it leaves no play between the wall of the hole 503 and the extension portion 130 of the gear shaft 13. The gear shaft 13 and innermost member 502a are enabled to rotate together. Therefore, as external force, such as the force generated by the friction from an intermediary transfer belt 82, acts upon the photoconductive drum 80, the external force is canceled by the braking force applied by the powder brake 501 between the innermost and outermost members 502a and 502b, respectively. Therefore, the female and male type portions of the driving force transmission mechanism are kept normally in contact with each other.

The braking force of the powder brake 501 is set within a range in which it succumbs to the torque of the gear shaft 13 as the output shaft, but overcomes the external force (for example, the force generated by the friction caused by the intermediary transfer belt 32) which acts upon the photoconductive drum 80. With the provision of the above described structural arrangement, the braking force provided by the powder brake 501 can keep the second coupling portion with the hole 50 with a polygonal cross section, normally in contact with the first coupling portion 10 in the form of a polygonal pillar, without interfering with the normal engagement of the first coupling portion 10 into the hole 50. Therefore, the photoconductive drum 80 is always driven by the driving system properly connected to the photoconductive drum 80.

The outermost member 502b is provided with such a mechanism that prevents the rotation of the outermost member 502b, while providing the outermost member 502b with directional play (FIG. 6).

With the provision of the above described structural arrangement, it becomes possible for the position of the cylindrical member 502 to be automatically adjusted as the extension portion 130 of the gear shaft 13 is inserted into the hole 503. Therefore, it is possible to prevent such a problem as the shaft to be driven becomes connected askew to the driving shaft at the coupling point.

Further, the driving force transmission mechanism in this embodiment is structured so that the extension portion 130 of the gear shaft 13 engages into the hole 503 after the engagement of the first coupling potion 10 in the form of a polygonal pillar into the hole 50 with a polygonal cross section. Such a structural arrangement can reduce the resistance felt by a user as the extension portion 130 of the gear shaft 13 engages into the hole 503, and the resistance felt by a user when the process unit is mounted may be taken as an assurance that the polygonal projection 10 is being properly set relative to the polygonal hole 50.

Incidentally, in this embodiment, the first coupling portion is in the form of a simple polygonal pillar. However, it may be in the form of a projection in the form of a twisted polygonal pillar, the twist angle of which is the same as that of the hole 50 of the second coupling portion, the cross section of which is polygonal, as is in the first embodiment. Further, regarding on which side between the driving system and driving system the projection 10 in the form of a polygonal pillar and the hole 50 with a polygonal cross section, are disposed, they can be disposed on either side, one for one, as in the first embodiment. Even if their positions are reversed from those in this embodiment, the same effects as those provided by this embodiment will be obtained.

Further, in this embodiment, the gear shaft 13 itself, more precisely, its extension portion 130 itself, is used as the coupling shaft. However, instead of using the extension portion 130 of the gear shaft 13 as a coupling shaft, a shaft, which is independent from the gear shaft 13, but is made to rotate with the gear shaft 13, may be employed as a coupling shaft.

In the above described this embodiment, the female type portion with a hole with a polygonal cross section, and male type portion with a projection in the form of a polygonal pillar, are chosen as the two sides of the coupling of the driving force transmission mechanism. However, the same effects as those provided by this embodiment can be obtained as long as the coupling of a driving force transmission mechanism employs female and male type portions which can be engaged with, and kept in contact with, each other.

As described above, in a driving force transmission mechanism, a process unit, and an image forming apparatus, which are in accordance with the present invention, the coupling of the driving force transmission mechanism comprises a female type portion and a male type portion, which are attached to one of the lengthwise ends of the output shaft of the main apparatus of the image forming apparatus, and one of the lengthwise ends of the cylindrical member in the process unit, one for one, and the driving force from the output shaft is transmitted to the cylindrical member through a plurality of interfaces, in the form of a point or a surface, between the female or male type portions. Either the female type portion or male type portion is provided with a shaft which protrudes in the direction of the gear shaft on the image forming apparatus main assembly side, and the other member, that is, the member which is not provided with the protruding shaft, is provided with a mechanism for providing a braking force which works on the wall of the hole of the female type portion and the protruding shaft, in their circumferential directions. Therefore, even if the driven side of the driving force transmission mechanism is subjected to an external force other than the force transmitted from the driving side of the driving force transmission mechanism, the contact between the female and male type portions is kept in the normal state of contact, assuring that the driving force is always satisfactorily transmitted from the driving side to the driven side, minimizing color deviation. Therefore, it is possible to provide a high quality image.

Embodiment 8

Figure 11:
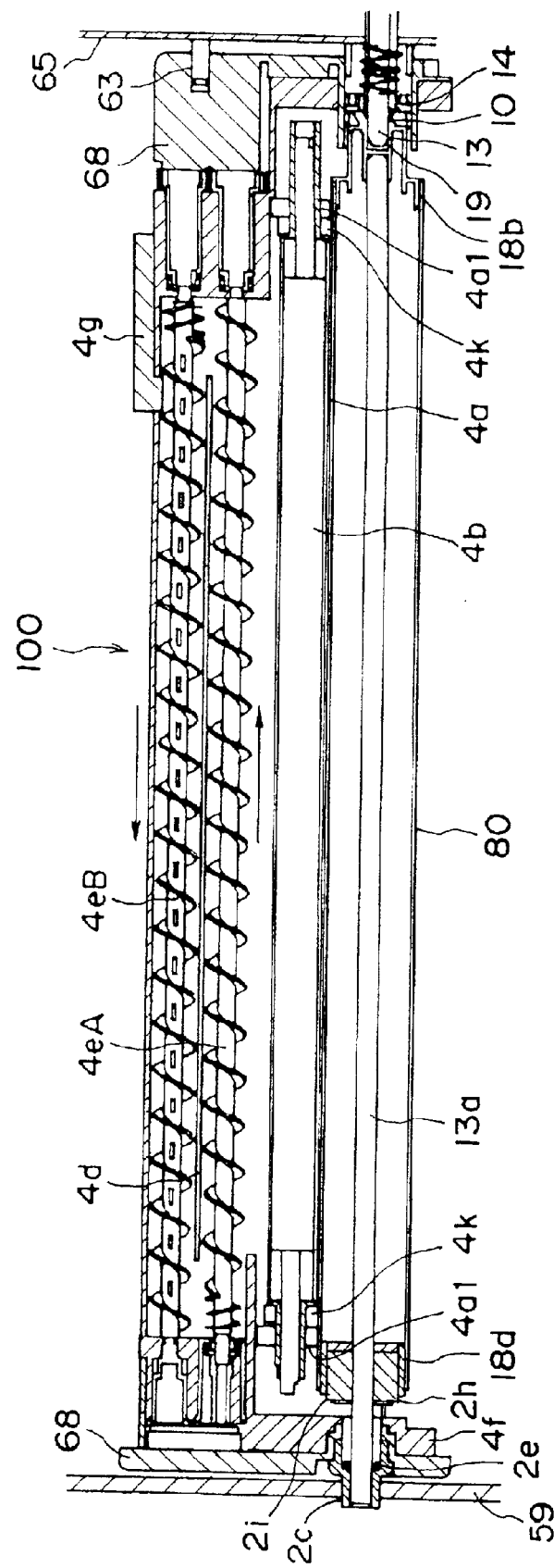
FIG. 11 is another example of a process unit in accordance with the present invention.
Figure 12:
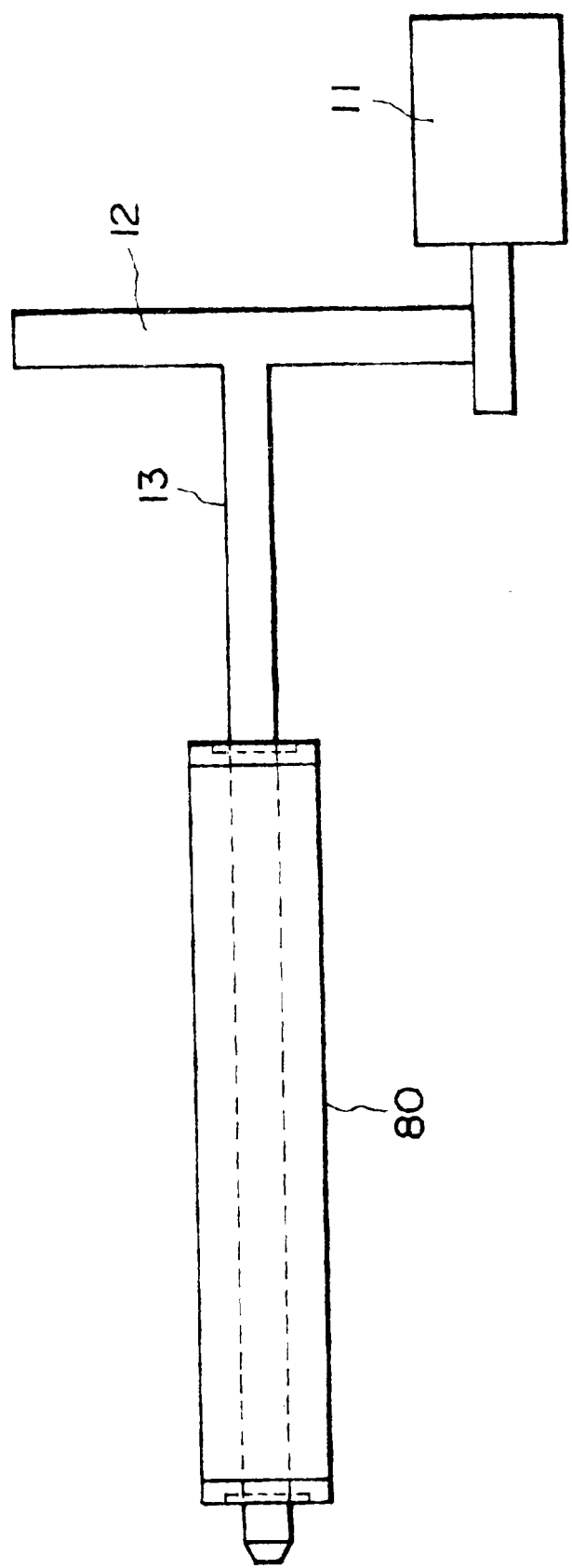
FIG. 12 is a drawing for describing a method for driving a photoconductive drum with the use of a shaft without a coupling.
Figure 13:
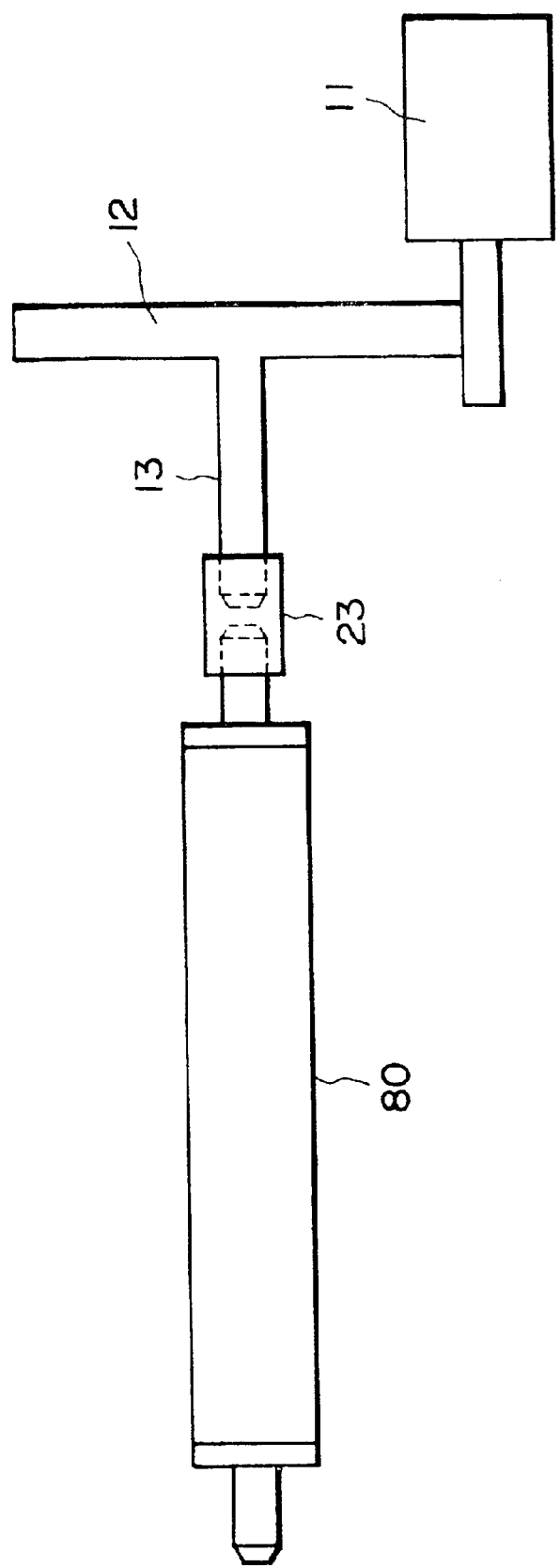
FIG. 13 is a drawing for describing a method for driving a photoconductive drum with the use of a shaft with a coupling.
Figure 14:
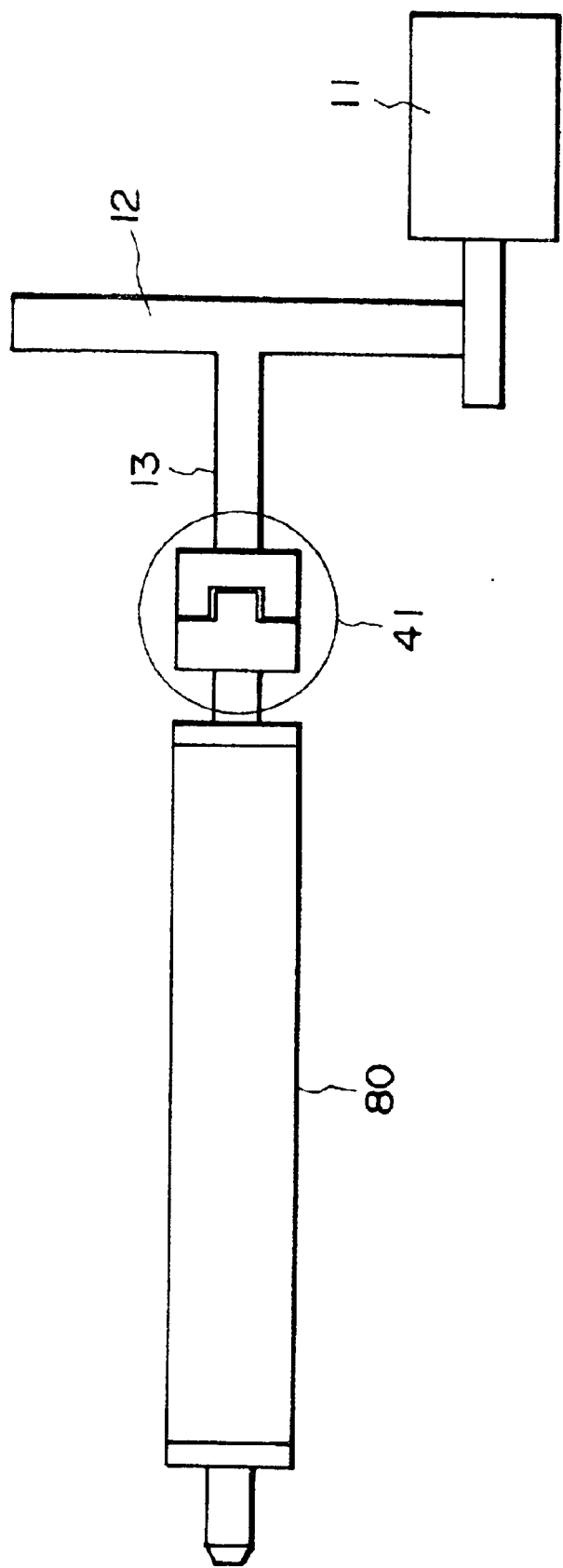
FIG. 14 is a drawing for a coupling comprising a female type portion and a male type portion, which couple with each other.
Figure 15:
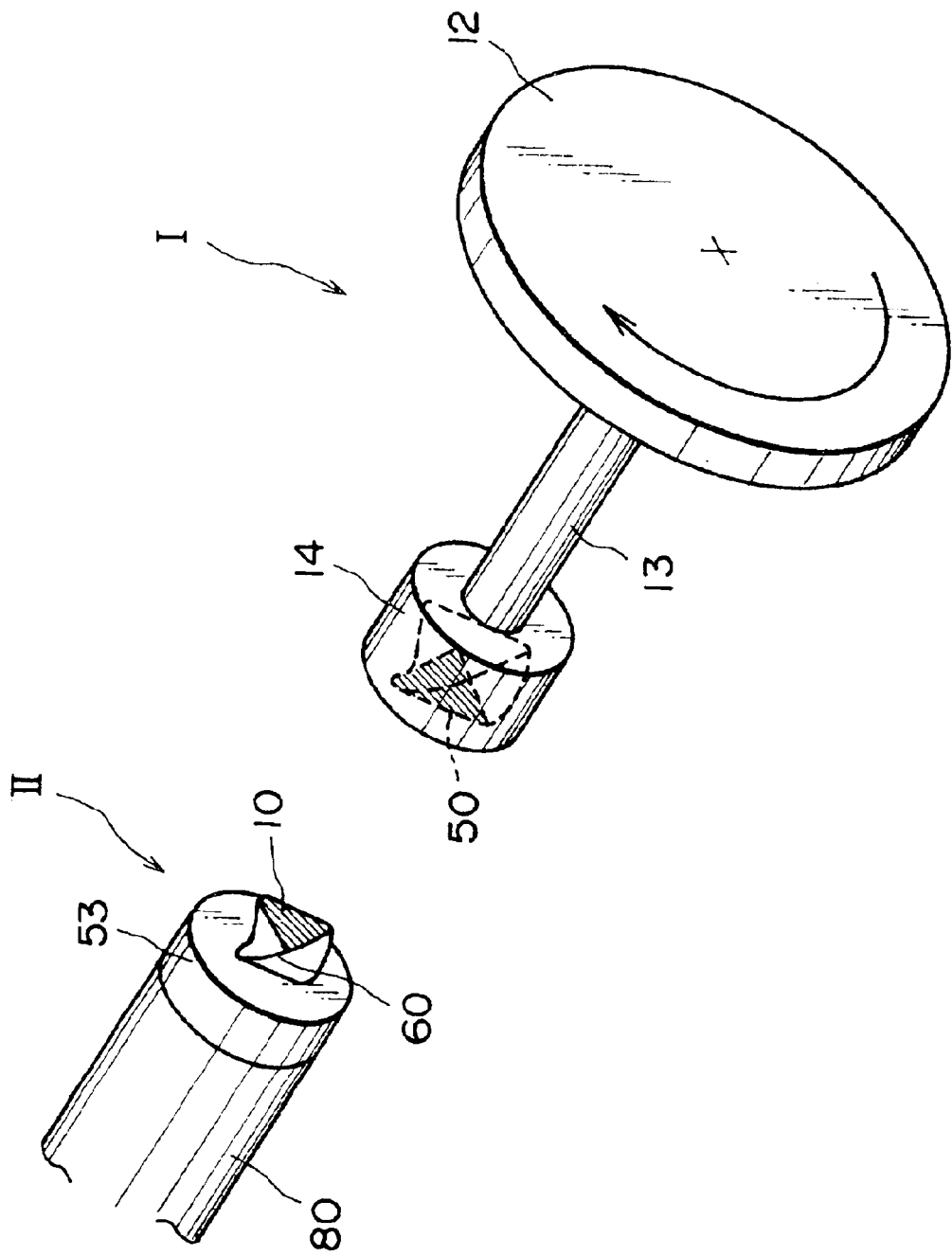
FIG. 15 is a drawing for describing a coupling comprising a female type portion with a coupling hole in the form of a polygonal pillar, and a male type portion with a coupling projection in the form of a polygonal pillar, which couple with each other.

In this embodiment, or the eighth embodiment, of the present invention, a center shaft is put through the driving force transmitting portion, and the braking force is applied to a shaft integral with the center shaft, to provide a stabler driving force transmission mechanism. This structural arrangement is shown in FIG. 11, which is a sectional view of a process unit 100 which employs the coupling in this embodiment.

The photoconductive drum 80, with which the process unit 100 removably mountable in the main assembly of an image forming apparatus is provided, is provided with drums flanges 18b and 18d, which are attached to the lengthwise ends of the photoconductive drum 80 one for one. The drum flange 18b is provided with a first coupling portion 10 in the form of a polygonal pillar, which is on the rear side of the apparatus, and to which the driving force is transmitted. The drum flange 18d is on the front side of the apparatus, and to which the driving force is not transmitted. The drum flanges 18b and 18d each are provided with a center hole, through which a drum shaft 13a is put. Further, the drum flange 18b is provided with a hole 19, in which the driving shaft 13 on the apparatus main assembly side is put. When the photoconductive drum 80 rotates, the drum shaft 13a, and drum flanges 18b and 18d, rotate with the photoconductive drum 80. In other words, the photoconductive drum 80 rotates about the axial line of the drum shaft 13a.

The front end of the drum shaft 13a is rotationally supported by a bearing 2e, which is fixed to a bearing case 2c. The bearing case 2c is fixed to the frame 59, also called the rotatable aligning plate, of the process unit 100.

As the process unit 100 is inserted into the image forming apparatus, the driving shaft 13, which also constitutes the center shaft of the coupling portion on the apparatus main assembly side, is inserted into the hole 19 of the drum flange 18b, enabling the drum shaft 13b and center shaft 13 to rotate together, and properly positioning the rotational center of the photoconductive drum 80 relative to the apparatus main assembly. At the same time, the first coupling portion 10, with which the drum flange 18b is provided, engages into the second coupling portion 14 with a hole, on the apparatus main assembly side, enabling the photoconductive drum 80 to be rotationally driven. The first coupling portion 10 is in the form of a triangular pillar, which not only is capable of transmitting the driving force, but also is capable of generating such force that pulls the photoconductive drum 80 toward the apparatus main assembly in terms of the axial direction of the center shaft 13, as the driving force is transmitted to the first coupling portion 10.

The rear plate 65 of the image forming apparatus is provided with a supporting pin 63 for positioning the process unit 100; as the supporting pin 63 is inserted into the frame 68 of the process unit 100, the position of the frame 68 of the process unit 100 becomes fixed.

On the front side of the apparatus main assembly, a rotatable aligning plate 59 is disposed, to which the bearing case 2c of the process unit 100 is fixed. Thus, as the process unit 100 comprising the photoconductive drum 80 is inserted into the apparatus main assembly through the above described steps, it is accurately positioned relative to the apparatus main assembly.

On the other hand, the drum flange 18d on the non-driven side, fixed to the front side of the photoconductive drum 80, is provided with a recess, the bottom portion of which is provided with a rib. Further, on the non-driven side, there is a torque limiter 2h, as a load generating means, for applying a predetermined amount of load to the drum shaft 13a in the circumferential direction of the photoconductive drum. The torque limiter 2h is fixed to the flange 18d on the non-driven side, by pressing one end of the torque limiter 2h into the rib. To the other end, that is, the one on the non-driven side, of the torque limiter 2h, a thrust applying member 2i as a means for generating pressure in the axial direction the drum shaft 13a is fixed. The thrust applying member 2i is provided with a tapered portion comprising ribs positioned equal distances from, and symmetrically with respect to, the axial line of the drum shaft 13a. With the provision of the above described structural arrangement, a predetermined amount of load is applied to the drum shaft 13a in the circumferential direction of the photoconductive drum 80 by the torque limiter 2h fixed to the drum flange 18d. Therefore, even if the process unit 100 is subject to an external force other than the driving force from the apparatus main assembly, the two sides of the coupling of the driving force transmitting portion are kept in the normal state of contact, being enabled to satisfactorily transmit the driving force, and therefore, minimizing color deviation. As a result, a high quality image can be obtained.

Incidentally, although the first coupling portion in this embodiment is in the form of a simple polygonal pillar, it may be in the form of a twisted polygonal pillar, as in the case of the modification of the first coupling portion in the preceding embodiments. Also, the polygonal pillar and polygonal hole may be positioned on the driving side and driven side of the coupling, respectively, or on the driven side and driving side, respectively, of the coupling; the same effects as those provided by this embodiment can be obtained even if the polygonal pillar and polygonal hole are reversed in position. In other words, the coupling portion with which the process unit 100 is provided may be in the form of a polygonal pillar or a polygonal hole.

While the invention has been described with reference to the structures disclosed herein, it is not confined to the details set forth and this application is intended to cover such modifications or changes as may come within the purposes of the improvements or the scope of the following claims.

What is claimed is:

1. A drive transmission apparatus comprising:
   a first coupling portion;
   a second coupling portion having a hole portion which has a cross-sectional configuration larger than said first coupling portion, said hole portion being engageable with said first coupling portion;
   a center shaft being provided on one of said first coupling portion and said second coupling portion, and said center shaft penetrating the other one of said first coupling portion and said second coupling portion,
   wherein said center shaft is rotatable integrally with said first coupling portion and said second coupling portion; and
   a brake actable on said center shaft in its circumferential direction.

2. An apparatus according to claim 1, wherein said brake applies a frictional force to said center shaft.

3. An apparatus according to claim 2, wherein the frictional force is applied by an elastic member contactable to said center shaft.

4. An apparatus according to claim 1, wherein said brake is a powder-brake.

5. An apparatus according to claim 1, wherein said brake includes a torque limiter.

6. An apparatus according to claim 1, wherein said brake includes magnetic force applying means for applying a magnetic force to said center shaft.

7. An apparatus according to claim 1, wherein said first coupling portion has a polygonal shape.

8. An image forming apparatus comprising:
   a photosensitive member;
   a flange member fixed to said photosensitive member;
   charging means for charging said photosensitive member;
   image forming means for forming an electrostatic image on said photosensitive member charged by said charging means;
   developing means for developing the electrostatic image;
   transferring means for transferring the image developed by said developing means onto a recording material;
   a driving source;
   a driver positioned and configured to transmit a driving force from said driving source to said photosensitive member;
   a first coupling portion;
   a second coupling portion having a hole portion which has a cross-sectional configuration larger than said first coupling portion, said hole portion being engageable with said first coupling portion; and
   a center shaft provided on one of said first coupling portion and said second coupling portion, said center shaft penetrating the other one of said first coupling portion and said second coupling portion,
   wherein one of said first coupling portion and said second coupling portion receives the driving force and is integral with said flange member, and the other one of said first coupling portion and said second coupling portion is provided on said driver.

9. An apparatus according to claim 8, wherein said first coupling portion receives the driving force from said second coupling portion.

10. An apparatus according to claim 8, wherein said photosensitive member is positioned correctly relative to said image forming apparatus using said center shaft.

11. An apparatus according to claim 8, wherein said center shaft has a tapered configuration at an end portion thereof.

12. An apparatus according to claim 8, wherein said first coupling portion has a twisted projection having a polygonal cross-section.

13. An apparatus according to claim 12, wherein the hole portion of said second coupling portion has a polygonal cross-section.

14. An apparatus according to claim 13, wherein said polygonal hole portion of said second coupling portion is twisted.

15. An apparatus according to claim 8, wherein said center shaft is rotatable integrally with said first and second coupling portions.

16. An apparatus according to claim 8, wherein said transferring means includes an intermediary transfer member.

17. An apparatus according to claim 8, wherein said photosensitive member is a part of a unit including process means actable on said photosensitive member.

18. An apparatus according to claim 17, wherein said process means includes at least one of said charging means, said developing means and cleaning means for cleaning said photosensitive member.

19. An image forming apparatus comprising:

a photosensitive member;

charging means for charging said photosensitive member;

image forming means for forming an electrostatic image on said photosensitive member charged by said charging means;

developing means for developing the electrostatic image;

transferring means for transferring the image developed by said developing means onto a recording material;

a driving source;

a driver configured and positioned to transmit a driving force from said driving source to said photosensitive member;

a first coupling portion;

a second coupling portion having a hole portion which has a cross-sectional configuration larger than said first coupling portion, said hole portion being engageable with said first coupling portion;

a center shaft provided on one of said first coupling portion and said second coupling portion, said center shaft penetrating the other one of said first coupling portion and said second coupling portion, wherein said photosensitive member has one of said first coupling portion and said second coupling portion, and said driver has the other one of said first coupling portion and said second coupling portion; and a brake actable on said center shaft in its circumferential direction.

20. An apparatus according to claim 19, wherein said brake applies a frictional force to said center shaft.

21. An apparatus according to claim 20, wherein the frictional force is applied by an elastic member contactable to said center shaft.

22. An apparatus according to claim 19, wherein said brake is a powder-brake.

23. An apparatus according to claim 19, wherein said brake includes a torque limiter.

24. An apparatus according to claim 19, wherein said brake includes magnetic force applying means for applying a magnetic force to said center shaft.

25. An apparatus according to claim 8 or 19, wherein said first coupling portion has a polygonal shape.

26. A process unit which is detachably mountable to a main assembly of an image forming apparatus having a driving portion, said process unit including process means actable on a photosensitive member, said process unit comprising:

a flange member fixed to the photosensitive member;

a coupling portion which is integral with said flange member and engageable with the driving portion of the main assembly of the apparatus; and a hole portion, provided in said coupling portion, configured and positioned to engage a center shaft provided in the driving portion.

27. A process unit according to claim 26, wherein said process unit is positioned correctly relative to the image forming apparatus using the center shaft.

28. A process unit according to claim 26, wherein the center shaft has a tapered configuration at an end portion thereof.

29. A process unit according to claim 26, wherein said coupling portion has a projection having a polygonal cross-section.

30. A process unit according to claim 29, wherein said polygonal projection is twisted.

31. A process unit according to claim 26, wherein the center shaft is rotatable integrally with said coupling portion.

32. A process unit according to claim 26, wherein said process means includes at least one of charging means for charging the photosensitive member, developing means for supplying developer to the photosensitive member, and cleaning means for cleaning the photosensitive member.

33. A process unit which is detachably mountable to a main assembly of an image forming apparatus having a driving portion, said process unit including process means actable on a photosensitive member, said process unit comprising:

a coupling portion engageable with the driving portion of the main assembly of the image forming apparatus;

a hole portion, provided in said coupling portion, configured and positioned to engage a center shaft provided in the driving portion; and a brake actable on the center shaft in its circumferential direction.

34. A process unit according to claim 33, wherein said brake applies a frictional force to the center shaft.

35. A process unit according to claim 34, wherein the frictional force is applied by an elastic member contactable to the center shaft.

36. A process unit according to claim 33, wherein said brake is a powder-brake.

37. A process unit according to claim 33, wherein said brake includes a torque limiter.

38. A process unit according to claim 33, wherein said brake includes magnetic force applying means for applying a magnetic force to the center shaft.

39. A process unit according to claim 26 or 33, wherein said coupling portion has a polygonal shape.

* * * * *

UNITED STATES PATENT AND TRADEMARK OFFICE
CERTIFICATE OF CORRECTION

PATENT NO. : 6,829,455 B2
DATED : December 7, 2004
INVENTOR(S) : Yasumoto et al.

It is certified that error appears in the above-identified patent and that said Letters Patent is hereby corrected as shown below:

Column 4,
Line 3, "photosensitive" should read -- photosensitive member --.

Column 5,
Line 43, "comprises" should read -- comprise --.

Column 9,
Line 57, "holes the" should read -- the holes --.

Column 12,
Line 18, "ments" should read -- ment --.

Column 19,
Line 18, "potion 10" should read -- portion 10 --.
Line 33, "driving system" should read -- driven system --.
Line 47, "this" should be deleted.

Signed and Sealed this

Seventeenth Day of May, 2005

JON W. DUDAS
*Director of the United States Patent and Trademark Office*